(12) United States Patent
Ikenaga

(10) Patent No.: US 8,368,457 B2
(45) Date of Patent: Feb. 5, 2013

(54) SEMICONDUCTOR INTEGRATED CIRCUIT DEVICE AND METHOD FOR CONTROLLING POWER SUPPLY VOLTAGE

(75) Inventor: Yoshifumi Ikenaga, Kanagawa (JP)

(73) Assignee: Renesas Electronics Corporation, Kawasaki-shi, Kanagawa (JP)

(*) Notice: Subject to any disclaimer, the term of this patent is extended or adjusted under 35 U.S.C. 154(b) by 212 days.

(21) Appl. No.: 12/923,342

(22) Filed: Sep. 15, 2010

(65) Prior Publication Data
US 2011/0068855 A1    Mar. 24, 2011

(30) Foreign Application Priority Data
Sep. 18, 2009   (JP) ................. 2009-217168

(51) Int. Cl.
*G11C 5/14*    (2006.01)
(52) U.S. Cl. ................. 327/530; 327/538
(58) Field of Classification Search ......... 327/530, 327/538, 540, 541, 543
See application file for complete search history.

(56) References Cited

U.S. PATENT DOCUMENTS

| | | | |
|---|---|---|---|
| 6,924,679 B2 | 8/2005 | Seno et al. | |
| 6,943,616 B2* | 9/2005 | Ogawa et al. | 327/538 |
| 7,071,768 B2* | 7/2006 | Abe et al. | 327/540 |
| 7,501,868 B2* | 3/2009 | Ito | 327/158 |
| 8,004,348 B2* | 8/2011 | Ikenaga et al. | 327/540 |

FOREIGN PATENT DOCUMENTS

| | | | |
|---|---|---|---|
| JP | 2002-100967 A | | 4/2002 |
| JP | 2009-38128 A | | 2/2009 |
| WO | WO 2008099878 A1 | * | 8/2008 |

* cited by examiner

*Primary Examiner* — Quan Tra
(74) *Attorney, Agent, or Firm* — McGinn IP Law Group, PLLC

(57) ABSTRACT

The present invention is a semiconductor integrated circuit device including a target circuit, a voltage supply circuit that supplies the power supply voltage to the target circuit, a control circuit that controls an output voltage of the voltage supply circuit, and a target voltage prediction circuit that predicts a voltage value of the power supply voltage. The control circuit changes the output voltage of the voltage supply circuit by a predetermined voltage value. The target voltage prediction circuit detects a change amount of an operating frequency of the target circuit along with the change of the predetermined voltage value, and calculates a target voltage value based on a relation between the change amount of the operating frequency and the predetermined voltage value. The voltage supply circuit supplies a power supply voltage corresponding to the target voltage value to the target circuit.

17 Claims, 25 Drawing Sheets

4

41

US 8,368,457 B2

SEMICONDUCTOR INTEGRATED CIRCUIT DEVICE AND METHOD FOR CONTROLLING POWER SUPPLY VOLTAGE

INCORPORATION BY REFERENCE

This application is based upon and claims the benefit of priority from Japanese patent application No. 2009-217168, filed on Sep. 18, 2009, the disclosure of which is incorporated herein in its entirety by reference.

BACKGROUND

1. Field of the Invention

The present invention relates to a semiconductor integrated circuit device and a method for controlling a power supply voltage and, in particular, to a semiconductor integrated circuit device and a method for controlling a power supply voltage that can control the power supply voltage of the semiconductor integrated circuit device to be an optimum power supply voltage in a short time.

2. Description of Related Art

There is included DVFS (Dynamic Voltage and Frequency Scaling) among systems for reducing power consumption of a semiconductor integrated circuit device using a CMOS (Complementary Metal Oxide Semiconductor) logic gate. DVFS is a system that controls a power supply voltage depending on a required operating speed (clock frequency). In order to efficiently reduce power consumption in DVFS, it is necessary to control a power supply voltage to be an optimum one in the shortest time and at the highest accuracy possible when the required operating speed is changed.

As a system for controlling a power supply voltage in DVFS, there is a system that determines whether an operating speed of a target semiconductor integrated circuit device satisfies a required speed or not using a delay monitor, and that controls a power supply voltage depending on the determined result. FIG. 31 is a block diagram showing a power supply voltage controller disclosed in Japanese Unexamined Patent Application Publication No. 2002-100967. In the power supply voltage controller shown in FIG. 31, a time period for controlling a power supply is reduced by comparing an operating speed of a circuit with a required operating speed by a delay monitor, and adjusting a voltage control amount depending on the compared result.

A power supply voltage controller 500 shown in FIG. 31 has a semiconductor circuit (LSI) 509 as a target circuit to which a controlled power supply voltage $V_{DD}$ is supplied, an input signal generation circuit 510, a monitor circuit 504 that monitors a delay characteristic of a critical path of the LSI 509, a delay detection circuit 505, and a power supply voltage control circuit 508. The power supply voltage control circuit 508 has a control circuit 506 and a voltage generation circuit 507. The input signal generation circuit 510 has a clock generation circuit 511 and a frequency divider circuit 503, and the clock generation circuit 511 is composed of a PLL circuit 501 and a selector 502.

The PLL circuit 501 incorporates an oscillator (VCO) controlled by a voltage, and locks an oscillation frequency of the oscillator based on, for example, an LSI drive clock CLK input from outside. A plurality of VCO outputs of the PLL circuit 501 is connected to each input of the selector 502, and a first output and a second output of the selector 502 are connected to inputs of the frequency divider circuit 503. The selector 502 outputs a signal in$\phi$i from the second output whose phase is delayed only by i with respect to a signal in$\phi$0 transmitted to the first output thereof. This phase i can be represented with an arbitrary phase angle within 0 to $2\pi$.

The frequency divider circuit 503 frequency-divides the signal in$\phi$0 from the first input at a predetermined frequency division ratio, and generates a signal out$\phi$0 to be supplied to the monitor circuit 504. In addition, the frequency divider circuit 503 frequency-divides the signal in$\phi$i from the second input at, for example, the same predetermined frequency division ratio, and generates a reference signal out$\phi$i to be supplied to the delay detection circuit 505. This reference signal out$\phi$i is generated as a signal that is delayed only by a variable delay value D with respect to the signal out$\phi$0 to be supplied to the monitor circuit 504. The monitor circuit 504 is configured as a circuit that has a power supply voltage delay characteristic equivalent to a signal transmission path selected as a critical path in the semiconductor circuit 509, and it operates with the supply of a power supply voltage $V_{DD}$ by the voltage generation circuit 507, transmits the signal out$\phi$0 output from the frequency divider circuit 503, and outputs a delayed signal out$\phi$0' to the delay detection circuit 505.

The delay detection circuit 505 detects a phase difference between the reference signal out$\phi$i and the output signal out$\phi$0' of the monitor circuit 504, generates an x-bit delay detection signal (x is an arbitrary natural number) depending on a detected result, and outputs it to the control circuit 506. The control circuit 506 controls the voltage generation circuit 507 based on the delay detection signal from the delay detection circuit 505, and changes a value of the supply voltage $V_{DD}$ to the LSI 509 and the monitor circuit 504.

Namely, when the output out$\phi$0' of the monitor circuit 504 is output later than a predetermined delay value specified by the reference signal out$\phi$i, the control circuit 506 outputs a request signal for increasing the supply voltage $V_{DD}$ to the voltage generation circuit 507, while, on the contrary, when the output out$\phi$0' of the monitor circuit 504 is output earlier than the predetermined delay value or when earlier than a delay value obtained by further subtracting a certain margin from the predetermined delay value, the control circuit 506 outputs a request signal for decreasing the supply voltage $V_{DD}$ to the voltage generation circuit 507. As a result, the voltage generation circuit 507 generates a new power supply voltage $V_{DD}$', and changes the current supply voltage into the new power supply voltage $V_{DD}$'.

In addition, in Japanese Unexamined Patent Application Publication No. 2009-38128, there is disclosed a technology on a semiconductor integrated circuit device that can suppress malfunction of a main function circuit and that can achieve low power consumption. The semiconductor integrated circuit device disclosed in Japanese Unexamined Patent Application Publication No. 2009-38128 is provided with the main function circuit to which a predetermined drive voltage is supplied when it is driven, detection means that detects a change of a characteristic of the main function circuit, and determination means that determines the drive voltage supplied to the main function circuit based on the detected result of the change of the characteristic of the main function circuit by the detection means, as well as having a predetermined main function. Moreover, the semiconductor integrated circuit device is provided with switch means that switches the supply voltage so that the drive voltage determined by the determination means may be supplied to the detection means when the main function circuit is driven and so that the predetermined voltage may be supplied thereto when the change of the characteristic of the main function circuit is detected.

In the semiconductor integrated circuit device disclosed in Japanese Unexamined Patent Application Publication No.

2009-38128, the supply voltage is switched so that the determined drive voltage may be supplied to the detection means that detects the change of the characteristic of the main function circuit due to a change of a usage environment, etc when the main function circuit is driven and so that the predetermined voltage may be supplied thereto when the change of the characteristic of the main function circuit is detected. As a result of this, a degree of degradation of the detection means and that of wires of the main function circuit become substantially the same as each other, and it becomes unnecessary to add a constant margin to a correction voltage, thus enabling to suppress the malfunction of the main function circuit and to achieve low power consumption.

SUMMARY

In order to change a power supply voltage of a semiconductor integrated circuit device to an optimum value in a short time, it is necessary to increase a speed at which the power supply voltage is changed, i.e., a control speed of the power supply voltage. In such a power supply circuit that a set value of an output voltage is controlled in an internal register etc., the control speed of the power supply voltage corresponds to an amount of voltage changed at one step. When the control speed of the power supply voltage is large, there is a possibility that a controlled power supply voltage oscillates near an optimum value, and convergence to the optimum value becomes rather slow or the convergence does not occur due to delay of a feedback from a speed monitor to a circuit that controls the power supply voltage, such as a regulator.

In the power supply voltage controller 500 disclosed in Japanese Unexamined Patent Application Publication No. 2002-100967 illustrated in FIG. 31, this problem has been solved by detecting the phase difference between the reference signal out$\phi$i and the output signal out$\phi$0' of the monitor circuit 504 using the delay detection circuit 505, and then controlling the control speed of the power supply voltage based on this detected result.

However, the present inventor has found problems as described below. In the power supply voltage controller 500 disclosed in Japanese Unexamined Patent Application Publication No. 2002-100967, it is necessary to pre-set a relation between an output of the delay detection circuit 505 and a voltage control amount output from the power supply voltage control circuit 508 for every required operating frequency. In addition, since it is necessary to repeat voltage control while suppressing the voltage control amount to not more than a constant value in order to prevent an oscillation near the optimum value of the voltage, it takes time to change the power supply voltage of the semiconductor integrated circuit device to the optimum value.

A first exemplary aspect of the present invention is a semiconductor integrated circuit device including: a target circuit, a power supply voltage of the target circuit being variable; a voltage supply circuit that supplies the power supply voltage to the target circuit; a control circuit that controls an output voltage of the voltage supply circuit; and a target voltage prediction circuit that predicts a voltage value of the power supply voltage supplied to the target circuit, wherein when a required operating frequency of the target circuit changes from a first operating frequency to a second operating frequency, the control circuit changes the output voltage of the voltage supply circuit by a predetermined voltage value, the target voltage prediction circuit detects a change amount of the operating frequency of the target circuit along with the change of the predetermined voltage value, and calculates a target voltage value based on a relation between the change amount of the operating frequency and the predetermined voltage value, and the voltage supply circuit supplies a power supply voltage corresponding to the target voltage value to the target circuit.

Thus, in the semiconductor integrated circuit device according to the first exemplary aspect of the present invention, when the required operating frequency of the target circuit is changed, the output voltage of the voltage supply circuit is changed by a predetermined voltage value, and the power supply voltage of the target circuit is changed by predicting the change amount of the power supply voltage corresponding to the change amount of the required operating frequency by the change of the operating frequency of the target circuit. Therefore, it is possible for the control circuit to reduce the number of times for changing the power supply voltage and to control the power supply voltage to be an optimum value in a short time.

A second exemplary aspect of the present invention is a method for controlling a power supply voltage, the power supply voltage being supplied to a target circuit, the method including: changing an output voltage of the voltage supply circuit by a predetermined voltage value, when a required operating frequency of the target circuit changes from a first operating frequency to a second operating frequency; detecting a change amount of an operating frequency of the target circuit along with a change of the predetermined voltage value; and calculating the power supply voltage supplied to the target circuit based on a relation between the change amount of the operating frequency and the predetermined voltage value.

Thus, in the method for controlling the power supply voltage according to the second exemplary aspect of the present invention, when the required operating frequency of the target circuit is changed, the output voltage of the voltage supply circuit is changed by a predetermined voltage value, and the power supply voltage of the target circuit is changed by predicting the change amount of the power supply voltage corresponding to the change amount of the required operating frequency by the change of the operating frequency of the target circuit. Therefore, it is possible to reduce the number of times for changing the power supply voltage and to control the power supply voltage to be an optimum value in a short time.

According to exemplary aspects of the present invention, it is possible to provide a semiconductor integrated circuit device and a method for controlling a power supply voltage that can control the power supply voltage to be an optimum value in a short time.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

First Exemplary Embodiment

Figure 1:
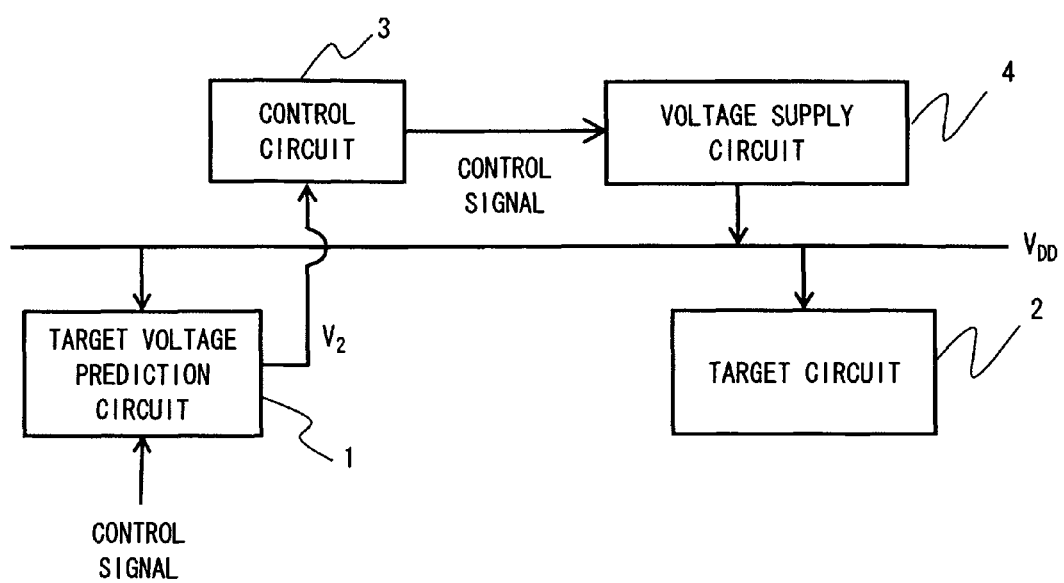
FIG. 1 is a block diagram showing a configuration of a semiconductor integrated circuit device according to a first exemplary embodiment.

Hereinafter, a first exemplary embodiment of the present invention will be described with reference to drawings. FIG. 1 is a block diagram showing a configuration of a semiconductor integrated circuit device 100 in accordance with the present exemplary embodiment. As shown in FIG. 1, the semiconductor integrated circuit device 100 in accordance with the present exemplary embodiment is provided with a target circuit 2 whose power supply voltage $V_{DD}$ is variable, a voltage supply circuit 4 that supplies a power supply voltage $V_{DD}$ to the target circuit 2, a control circuit 3 that controls an output voltage of the voltage supply circuit 4, and a target voltage prediction circuit 1 that predicts a voltage value of the power supply voltage $V_{DD}$ supplied to the target circuit 2.

When a required operating frequency of the target circuit 2 changes from a first operating frequency $f_1$ to a second operating frequency $f_2$, the control circuit 3 changes the output voltage of the voltage supply circuit 4 only by a predetermined voltage value $\Delta V$. As well as detecting a change amount of the operating frequency of the target circuit 2 along with the change of the predetermined voltage value $\Delta V$, the target voltage prediction circuit 1 calculates a target voltage value $V_2$ based on a relation between the change amount of the operating frequency and the predetermined voltage value $\Delta V$. In addition, the voltage supply circuit 4 supplies a power supply voltage of the target voltage value calculated by the target circuit 2.

In a manner described above, in the semiconductor integrated circuit device in accordance with the present exemplary embodiment, the power supply voltage $V_{DD}$ of the target circuit 2 is controlled to be the optimum value $V_2$. Hereinafter, the semiconductor integrated circuit device in accordance with the present exemplary embodiment will be described in detail.

Figure 2:
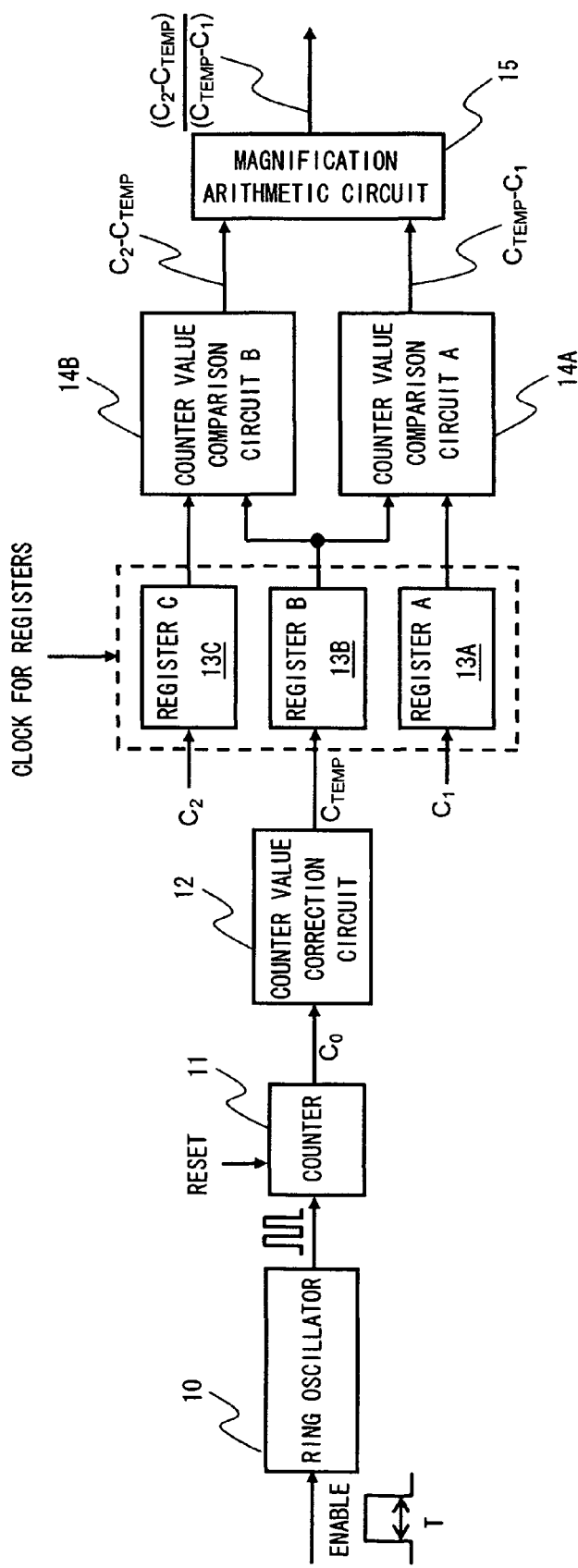
FIG. 2 is a block diagram showing a configuration of a target voltage prediction circuit in the semiconductor integrated circuit device according to the first exemplary embodiment.

FIG. 2 is a block diagram showing a detailed configuration of the target voltage prediction circuit 1 with which the semiconductor integrated circuit device 100 in accordance with the present exemplary embodiment is provided. The target voltage prediction circuit 1 has a ring oscillator 10, a counter 11, a counter value correction circuit 12, registers 13A, 13B, and 13C, counter value comparison circuits 14A and 14B, and a magnification arithmetic circuit 15. The same power supply voltage $V_{DD}$ as the target circuit 2 is supplied to the ring oscillator 10.

The ring oscillator 10 oscillates only for a period T when it holds that ENABLE=1. The counter 11 is reset once before it holds that ENABLE=1, counts an output pulse number $C_0$ of the ring oscillator in the period T when it holds that ENABLE=1, and the counted value is stored in the register 13B after it is corrected by the counter value correction circuit 12 so that it may hold that $C_{TEMP}=kC_0$. Here, the value of k satisfies the condition 0<k≦1. In addition, $C_{TEMP}$ is a value reflecting the operating frequency of the power supply voltage supplied to the target circuit 2.

In addition, performance required for the target circuit 2, i.e., counter values $C_1=T\times f_1$ and $C_2=T\times f_2$ corresponding to the required operating frequencies $f_1$ and $f_2$, are stored in the registers 13A and 13C, respectively. Here, $C_1$ and $C_2$ are counter values required to satisfy the required operating frequencies $f_1$ and $f_2$, respectively, and thus they are known values. $C_{TEMP}-C_1$ and $C_2-C_{TEMP}$ are stored in the counter value comparison circuits 14A and 14B, respectively. In addition, the counter value comparison circuit 14A outputs $C_{TEMP}-C_1$ to the magnification arithmetic circuit 15, while the counter value comparison circuit 14B outputs $C_2-C_{TEMP}$ thereto. The magnification arithmetic circuit 15 is a circuit that calculates $(C_2-C_{TEMP})(C_{TEMP}-C_1)$ and then outputs it, and it works as a step size prediction circuit.

Figure 3:
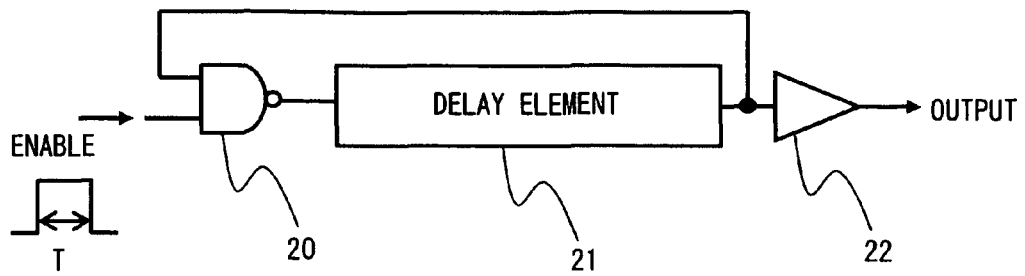
FIG. 3 is a diagram showing a configuration of a ring oscillator in the semiconductor integrated circuit device according to the first exemplary embodiment.

A configuration example of the ring oscillator 10 will be shown in FIG. 3. The ring oscillator 10 has a NAND 20, a delay element 21, and a buffer 22. A delay time of the delay element 21 is a half of a critical path delay of the target circuit 2, and an oscillation cycle of the ring oscillator 10 is equal to the critical path delay.

Figure 4:
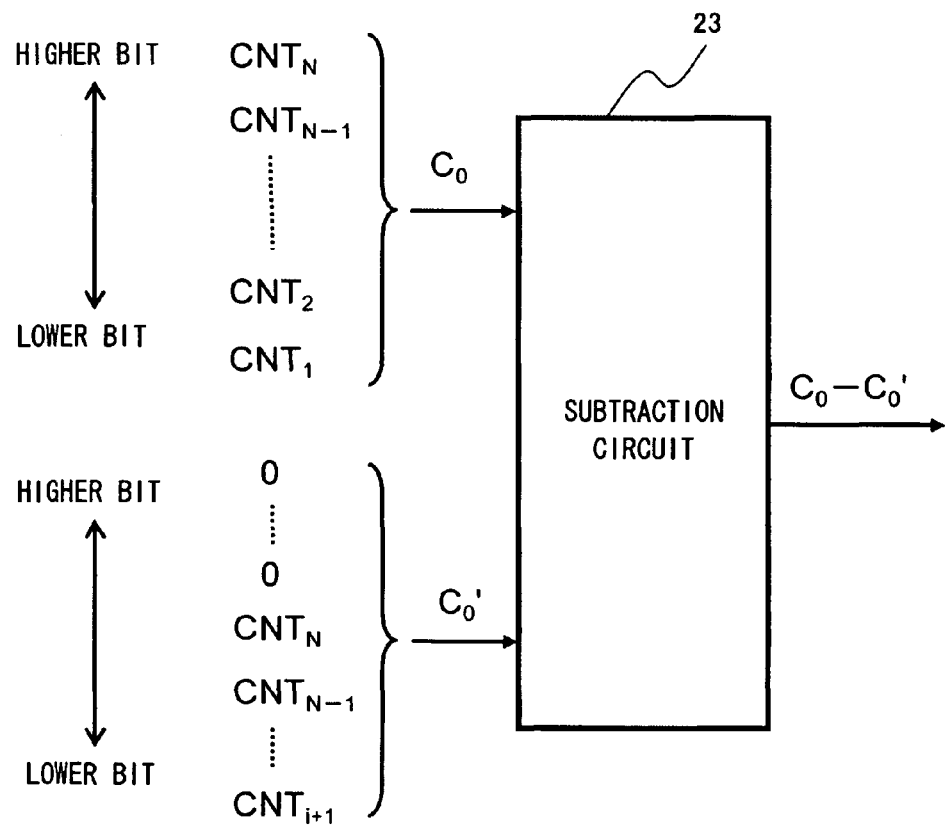
FIG. 4 is a diagram showing a configuration of a counter value correction circuit in the semiconductor integrated circuit device according to the first exemplary embodiment.

A configuration example of the counter value correction circuit 12 will be shown in FIG. 4. The counter value correction circuit 12 has a subtraction circuit 23, to which an output of the counter 11 is supplied as it is as a minuend $C_0$, and to which a numerical value obtained by bit-shifting $C_0$ only by i-bit lower is supplied as a subtrahend $C_0'$. Given that $C_0$ is an N-bit numerical value and that it is $CNT_N, CNT_{N-1}, \ldots,$ and $CNT_1$ in a higher bit order, $C_0'$ is $0, \ldots, 0, CNT_N, \ldots,$ and $CNT_{i+1}$ in the higher bit order. Here, i-bit 0 is supplied to a higher bit. Using such circuit configuration enables correction of an expression $C_{TEMP}=C_0-C_0'=kC_0$ to be easily achieved. Here, it holds that $k=1-2^{(-i)}$.

Figure 5:
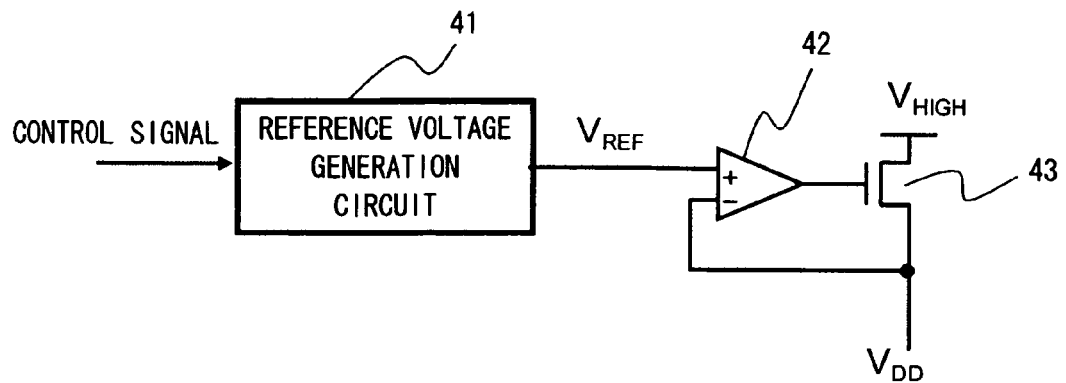
FIG. 5 is a diagram showing a configuration of a voltage supply circuit in the semiconductor integrated circuit device according to the first exemplary embodiment.

A configuration example of the voltage supply circuit 4 will be shown in FIG. 5. The voltage supply circuit 4 has a reference voltage generation circuit 41, an operational amplifier 42, and an NMOSFET 43. An output $V_{REF}$ of the reference voltage generation circuit 41 is supplied to a non-inverting input terminal of the operational amplifier, and the output $V_{DD}$ of the voltage supply circuit 4 is controlled so that it may hold that $V_{DD}=V_{REF}$. The reference voltage generation circuit 41 is controlled by the control circuit 3, and the output $V_{DD}$ of the voltage supply circuit 4 changes along with a change of a reference potential $V_{REF}$.

Figure 6:
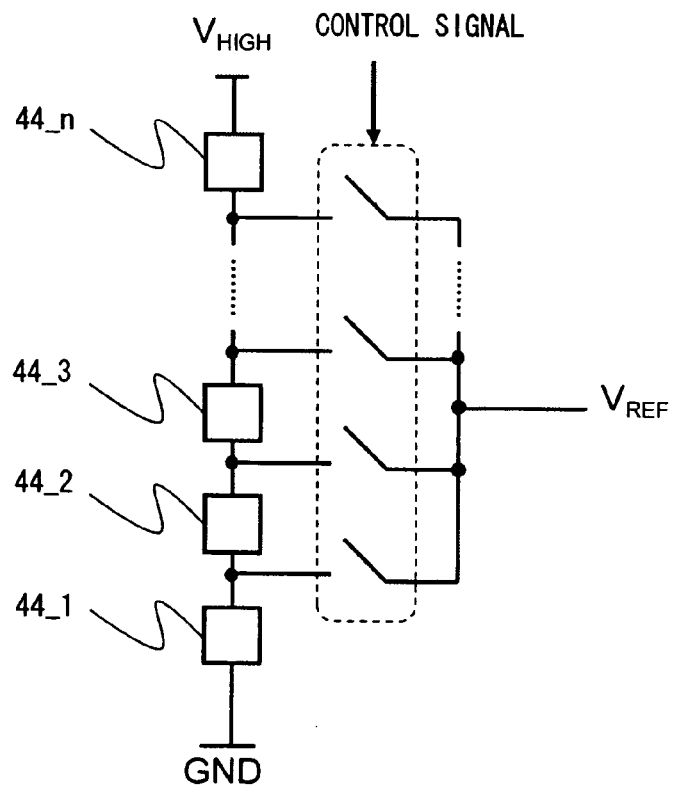
FIG. 6 is a diagram showing a configuration of a reference voltage generation circuit in the semiconductor integrated circuit device according to the first exemplary embodiment.

A configuration example of the reference voltage generation circuit 41 will be shown in FIG. 6. The reference voltage generation circuit 41 is composed of series-connected n resistances 44_1, 44_2, ..., and 44_n, and n−1 switches inserted between each node between the resistances and an output. Only any one of switches is in an ON state, and an output $V_{REF}$ corresponds with a potential of a connected node. ON/OFF of the switches is controlled by a control signal output from the control circuit 3.

Figure 7:
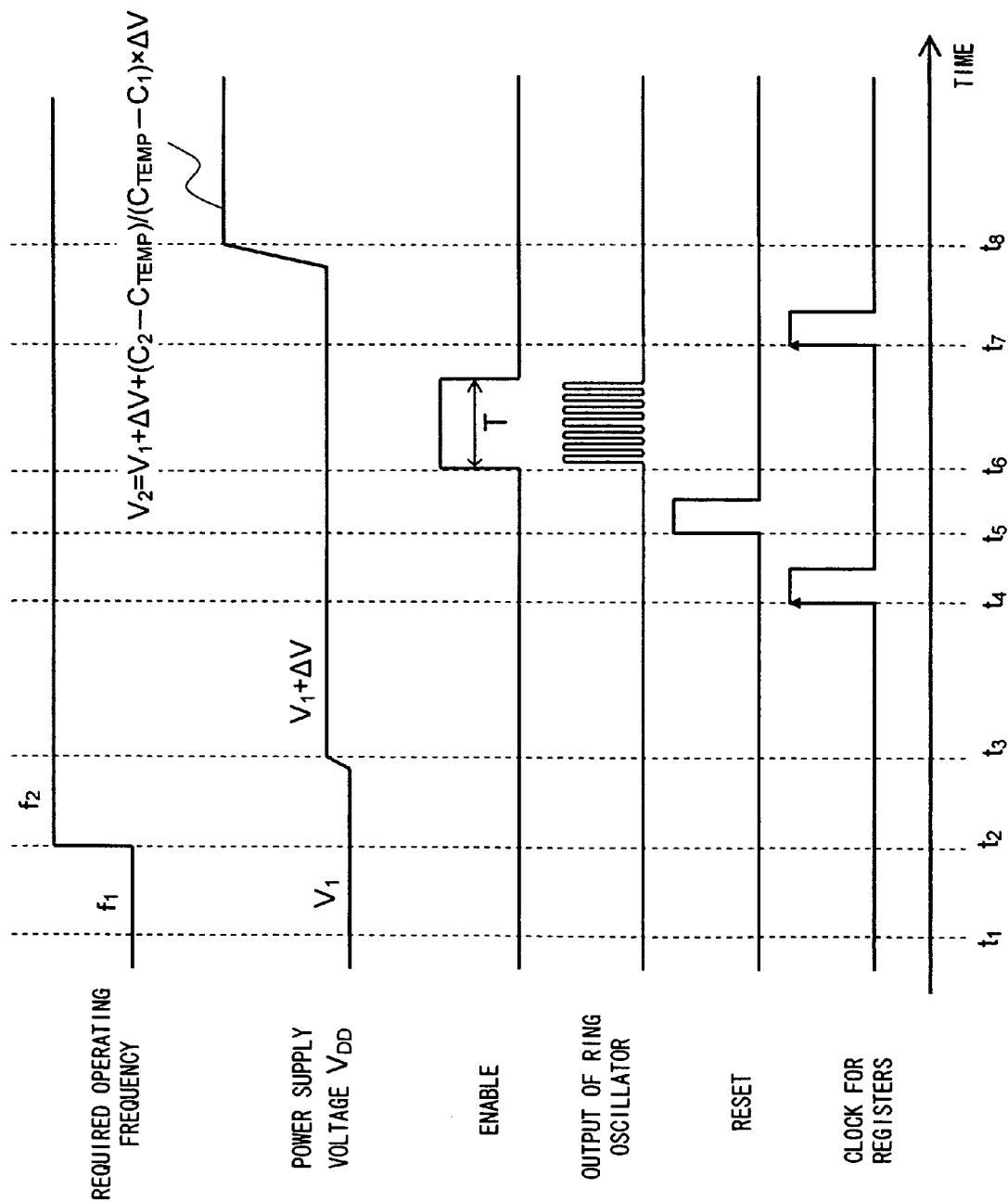
FIG. 7 is a timing chart showing an operation of the semiconductor integrated circuit device according to the first exemplary embodiment.
Figure 8:
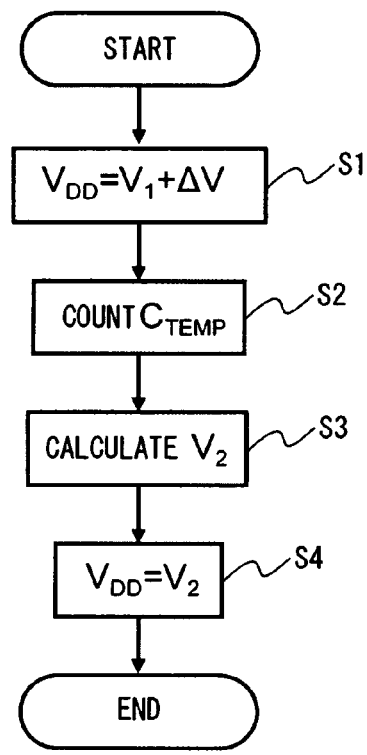
FIG. 8 is a flow chart showing the operation of the semiconductor integrated circuit device according to the first exemplary embodiment.

Next, operations of the semiconductor integrated circuit device will be described using a timing chart shown in FIG. 7 and a flow chart shown in FIG. 8 when a required operating frequency changes from $f_1$ to $f_2$.

First, as an initial state, a power supply voltage of the target circuit 2 with respect to the required operating frequency $f_1$, i.e., an output $V_{DD}$ of the voltage supply circuit 4, is defined as $V_1$ ($t_1$). Here, the power supply voltage $V_1$ is a minimum power supply voltage required for the operation of the target circuit 2 at the required operating frequency $f_1$. When $f_1$ changes to $f_2$ with respect to this state ($t_2$), the control circuit 3 first controls the output voltage of the voltage supply circuit 4 to be $V_1+\Delta V$ ($t_3$ at Step S1).

Subsequently, values of $C_1$ and $C_2$ are stored in the registers 13A and 13C of the target voltage prediction circuit 1, respectively ($t_4$). Here, it holds that $C_1=T\times f_1$, and $C_2=T\times f_2$. Moreover, after it holds that RESET=1 (high level) and the counter 11 is reset ($t_5$), ENABLE supplied to the ring oscillator 10 becomes 1 (high level) only during a period T ($t_6$), and a count value $C_{TEMP}$ based on the number of times of oscillation of the ring oscillator 10 during the period T is stored in the register 13B ($t_7$ at Step S2).

After the values are stored in the respective registers 13A, 13B, and 13C, $C_{TEMP}-C_1$ and $C_2-C_{TEMP}$ are stored in the counter value comparison circuits 14A and 14B, respectively. The counter value comparison circuit 14A then outputs $C_{TEMP}-C_1$ to the magnification arithmetic circuit 15, while the counter value comparison circuit 14B outputs $C_2-C_{TEMP}$ thereto. Moreover, the magnification arithmetic circuit 15 calculates $(C_2-C_{TEMP})/(C_{TEMP}-C_1)$ and outputs it (at Step S3). Subsequently, the control circuit 3 controls the output voltage $V_{DD}$ of the voltage supply circuit 4 to be $V_2=V_1+\Delta V+(C_2-C_{TEMP})(C_{TEMP}-C_1)\times\Delta V$ ($t_8$ at Step S4).

Here, generally, a maximum frequency f at which the circuit can operate with the power supply voltage $V_{DD}$ is represented by a next approximate equation.

$$f=A(V_{DD}-V_{TH}) \qquad \text{Equation 1}$$

Here, A and $V_{TH}$ are constants depending on a circuit configuration or a temperature. Given that the operating frequency changes from $f_1$ to $f_2$ when changing the power supply voltage from $V_1$ to $V_2$, it can represent as follows.

$$f_2-f_1=A(V_2-V_1) \qquad \text{Equation 2}$$

Consequently, a change amount of the power supply voltage and that of the operating frequency are proportional to each other. As a result, given that the change amount of the operating frequency is $\Delta f$ when changing the power supply voltage from $V_1$ to $V_1+\Delta V$, a following equation holds eventually.

$$V_2 = V_1 + \frac{f_2 - f_1}{\Delta f} \cdot \Delta V \qquad \text{Equation 3}$$

Namely, when the required operating frequency changes from $f_1$ to $f_2$, if $\Delta V$ and $\Delta f$ are known, a required power supply voltage $V_2$ can be determined regardless of A or VTH. Moreover, in the present exemplary embodiment, since values stored in the respective registers 13A, 13B, and 13C are $C_1=T\times f_1$, $C_{TEMP}=T\times(f_1+\Delta f)$, and $C_2=T\times f_2$, respectively, Equation 3 can be represented as follows.

$$V_2 = V_1 + \frac{C_2 - C_1}{C_{TEMP} - C_1} \cdot \Delta V \qquad \text{Equation 4}$$
$$= V_1 + \Delta V + \frac{C_2 - C_{TEMP}}{C_{TEMP} - C_1} \cdot \Delta V$$

Here, the target voltage prediction circuit 1 can determine a target voltage value so that a ratio of a difference between the operating frequency $f_2$ and the operating frequency $f_1$ to a difference between the target voltage value $V_2$ and the power supply voltage value $V_1$ before changed may become equal to a ratio of the change amount of the operating frequency $\Delta f$ to a predetermined voltage $\Delta V$.

Hence, by using the semiconductor integrated circuit device in accordance with the present exemplary embodiment, the power supply voltage $V_2$ can be controlled to be a minimum power supply voltage required to satisfy the required operating frequency $f_2$ for the target circuit 2.

As described above, by using the semiconductor integrated circuit device in accordance with the present exemplary embodiment, when the required operating frequency of the target circuit 2 changes, the number of times for controlling the power supply voltage, the control being performed to converge the power supply voltage to the required minimum power supply voltage, can be suppressed to twice, thus enabling to reduce a time period for controlling the power supply voltage.

Figure 30:
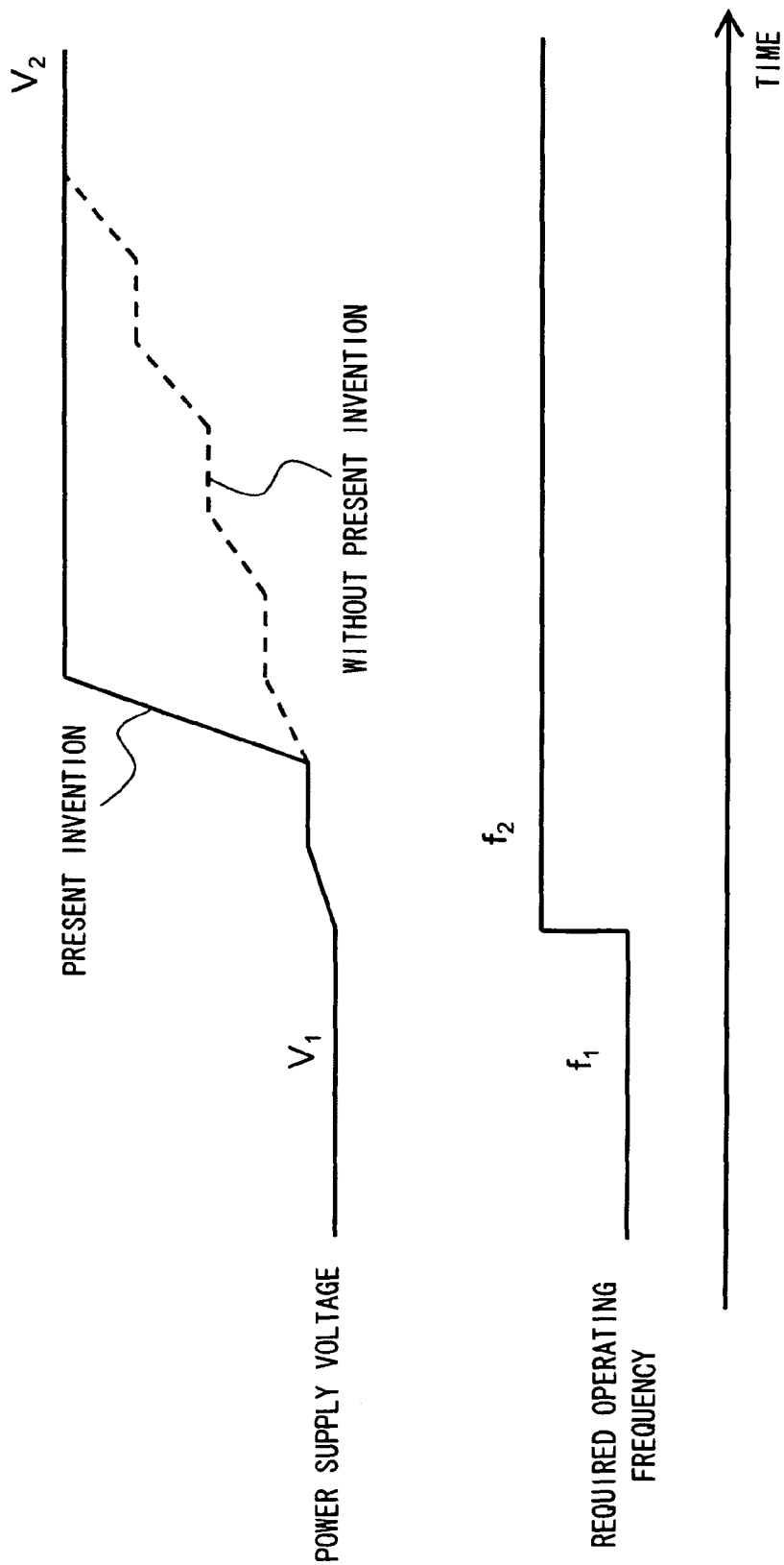
FIG. 30 is a timing chart illustrating a case where a power supply voltage is controlled using the semiconductor integrated circuit device according to the present invention.
Figure 31:
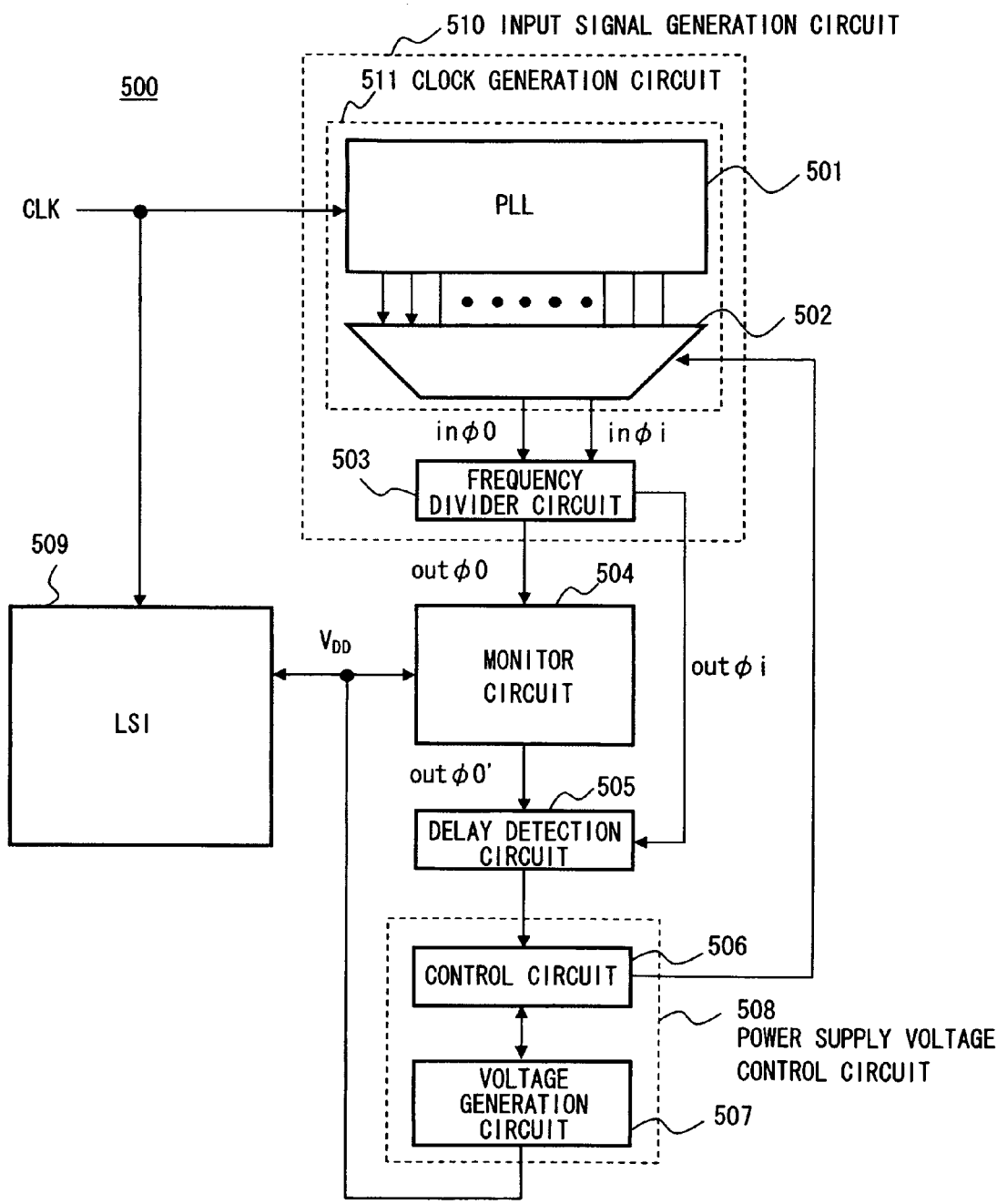
FIG. 31 is a block diagram showing a power supply voltage controller disclosed in Japanese Unexamined Patent Application Publication No. 2002-100967.

FIG. 30 is a timing chart illustrating a case where a power supply voltage is controlled using the semiconductor integrated circuit device in accordance with the present exemplary embodiment. As shown in FIG. 30 when the present invention is employed, a power supply voltage supplied to a target circuit can be changed from $V_1$ to $V_2$ more promptly than a case without employing the present invention. In addition, the semiconductor integrated circuit device in accordance with the present exemplary embodiment enables the power supply voltage to be controlled to be an optimum value in a short time without making the power supply voltage into an oscillation state.

Figure 9:
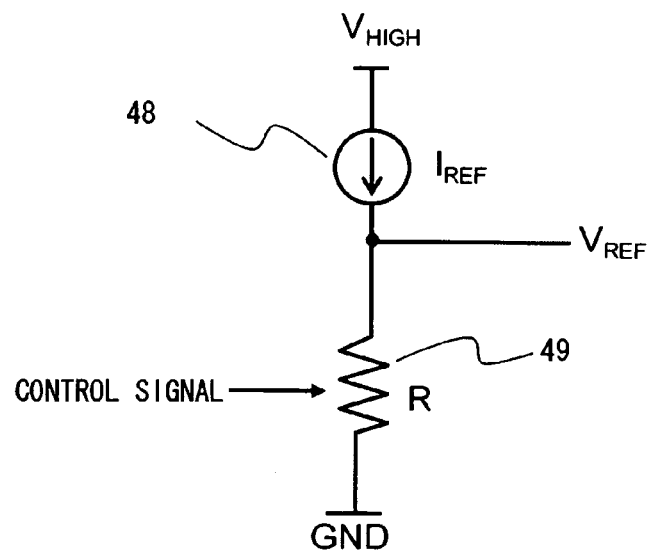
FIG. 9 is a diagram showing another configuration of the reference voltage generation circuit in the semiconductor integrated circuit device according to the first exemplary embodiment.

It is to be noted that in the semiconductor integrated circuit device in accordance with the present exemplary embodiment, although the circuit shown in FIG. 6 is used as the reference voltage generation circuit 41, for example, a circuit shown in FIG. 9 that has a current source 48 and a variable resistance 49 may be used as the reference voltage generation circuit 41. Here, the current source 48 is a current source that applies a constant current value $I_{REF}$, and the variable resistance 49 has a resistance value R. An output $V_{REF}$ of this circuit is represented by an expression $V_{REF} = I_{REF} \times R$, and the resistance value R of the variable resistance 49 is controlled by the control circuit 3, whereby the output $V_{REF}$ can be changed. It is to be noted that in the circuit shown in FIG. 9, a reference voltage may be changed by fixing the resistance value R of the variable resistance 49 and changing a current value of the current source 48. In this case, the current value of the current source 48 is controlled by the control circuit 3.

Moreover, in the semiconductor integrated circuit device in accordance with the present exemplary embodiment, although a series regulator is used as a regulator, anything may be used as long as it is a regulator that can control a changing speed of an output voltage, for example, a switching regulator etc. may be used.

Figure 10:
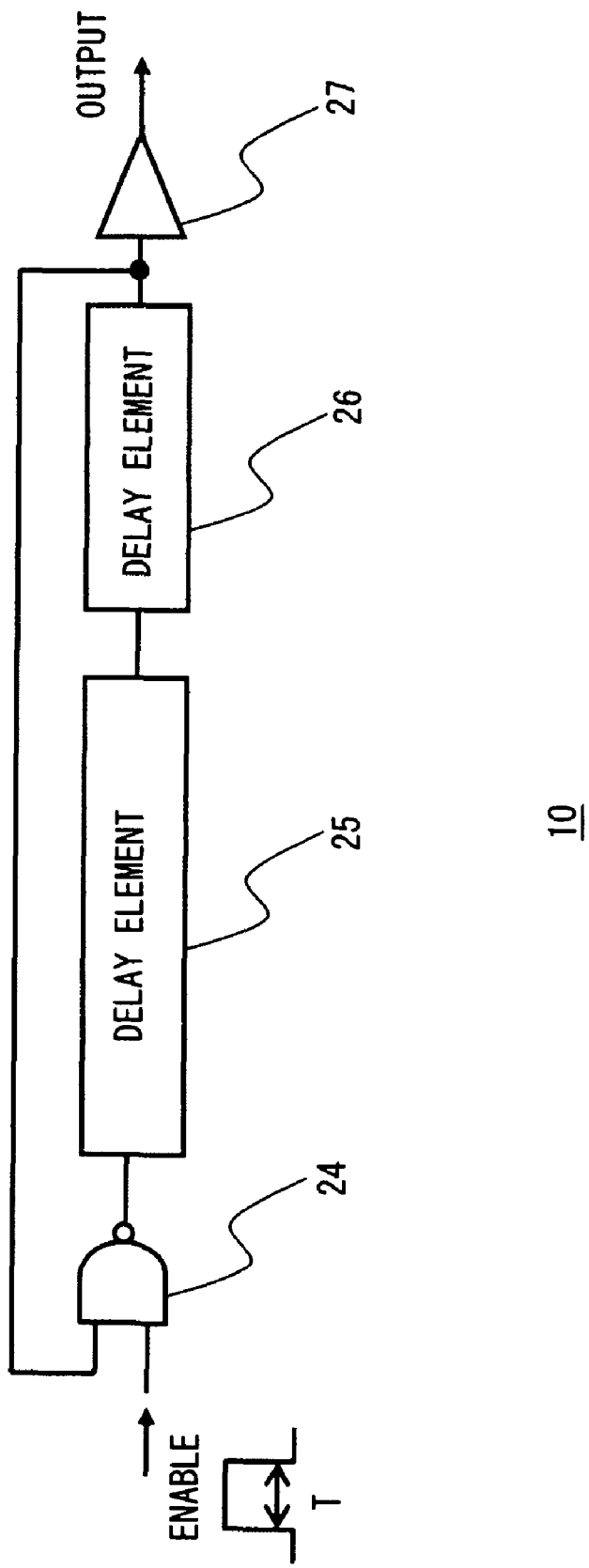
FIG. 10 is a diagram showing another configuration of the ring oscillator in the semiconductor integrated circuit device according to the first exemplary embodiment.

In addition, in the semiconductor integrated circuit device in accordance with the present exemplary embodiment, although an oscillation cycle of the ring oscillator 10 is equal to a critical path delay of the target circuit 2, for example, the ring oscillator 10 shown in FIG. 10 may be used. The ring oscillator 10 shown in FIG. 10 has a NAND 24, two delay elements 25 and 26, and a buffer 27. Here, delay times of the delay elements 25 and 26 are ½ times and $(A-1)/2$ times of the critical path delay of the target circuit 2, respectively, and the oscillation cycle is A times of the critical path delay. Here, the value A satisfies the condition $1 < A$.

Figure 11:
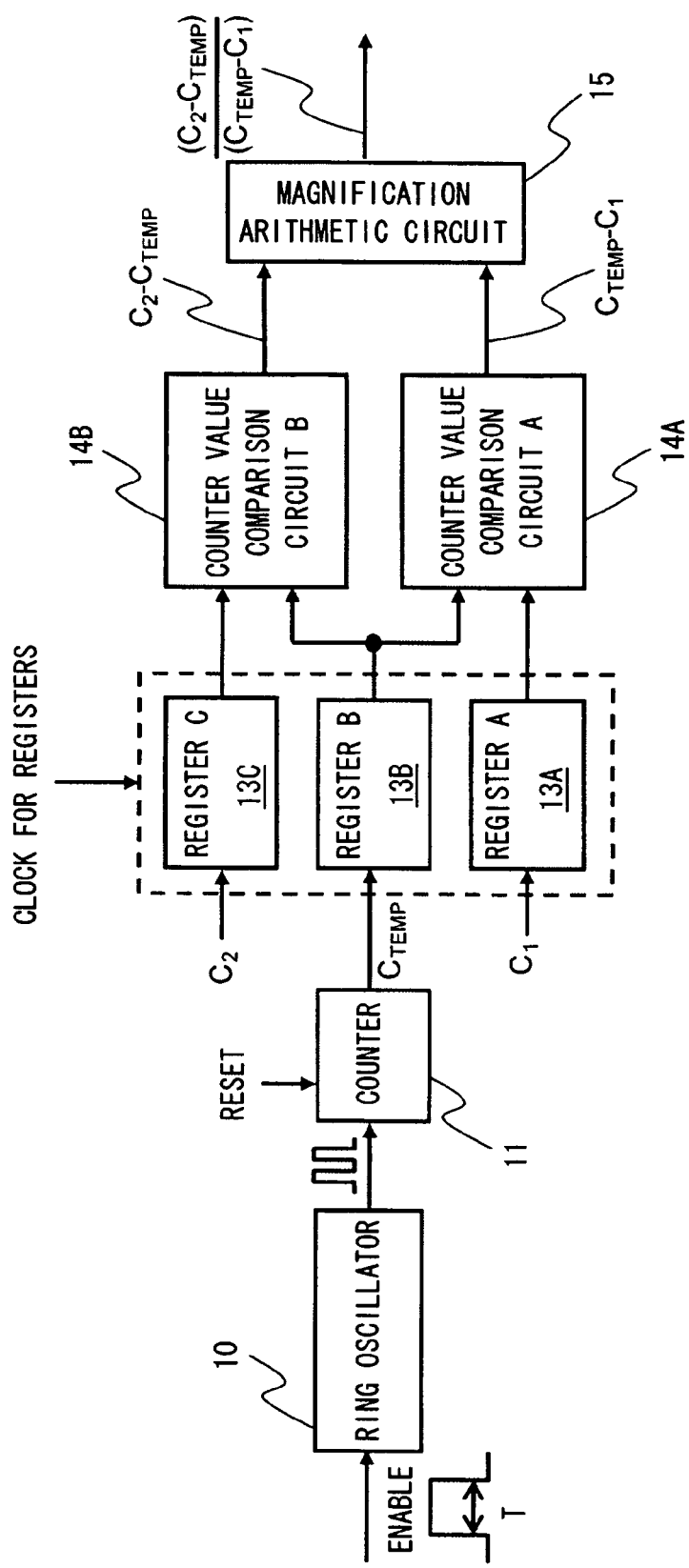
FIG. 11 is a block diagram showing another configuration of the target voltage prediction circuit in the semiconductor integrated circuit device according to the first exemplary embodiment.

Since operation performance of the target circuit 2 can have a margin with respect to the required operating frequency by using such ring oscillator, when the operating frequency of the target circuit 2 decreases due to a temperature change etc., or even when an error occurs between the delay time of the delay element 25 and the half delay of the critical path delay of the actual target circuit, the circuit can be made to operate while the required operating frequency is always satisfied. Moreover, given that $A=1/K$, an output pulse number of the ring oscillator during a constant time period increases k times, whereby the counter value correction circuit 12 can be omitted in the target voltage prediction circuit 1 as shown in FIG. 11.

In addition, in the semiconductor integrated circuit device in accordance with the present exemplary embodiment, although a value stored in the register 13B is defined as $C_{TEMP} = kC_0$, it may be defined as $C_{TEMP} = C_0 - B$. Here, it holds that $0 < B < C_{TEMP}$. Such circuit operation can be achieved by supplying B as a subtrahend $C_0'$ in the counter value correction circuit 12 shown in FIG. 4. Since the operation performance of the target circuit 2 can have the margin with respect to the required operating frequency by storing such value in the register 13B, even when the operating frequency of the target circuit 2 decreases due to a temperature change etc., the circuit can be made to operate while the required operating frequency is always satisfied.

In addition, in the semiconductor integrated circuit device in accordance with the present exemplary embodiment, although the counter value correction circuit 12 is composed of a subtractor, anything may be used as long as it is an arithmetic circuit that multiplies an input numerical value by k and that outputs it. In addition, in the semiconductor integrated circuit device in accordance with the present exemplary embodiment, although a correction coefficient k is defined as a fixed value when an output of the counter 11 is corrected by the counter value correction circuit 12, it may change depending on the output of the voltage supply circuit 4.

In addition, in the semiconductor integrated circuit device in accordance with the present exemplary embodiment, although the oscillation cycle of the ring oscillator 10 is equal to the critical path delay of the target circuit 2, a ring oscillator may be used whose oscillation cycle is n times of the critical path delay. Here, it holds that $1 < n$. Use of such ring oscillator enables the operation performance required for the counter to be reduced.

In addition, in the semiconductor integrated circuit device in accordance with the present exemplary embodiment, although the output of the ring oscillator is supplied to the counter, an output obtained by frequency-dividing the output of the ring oscillator into N may be supplied to the counter. Here, it holds that $1 < N$. In this case, values of $T \times f_1/N$ and $T \times f_2/N$ are stored in the registers 13A and 13C, respectively. Use of such semiconductor integrated circuit device enables the operation performance required for the counter to be reduced without increasing a circuit area of the ring oscillator.

Second Exemplary Embodiment

Next, a second exemplary embodiment of the present invention will be described. In the second exemplary embodiment, only the configuration of the target voltage prediction circuit 1 is different from that of the semiconductor integrated circuit device in accordance with the first exemplary embodiment of the present invention shown in FIG. 1. Configurations other than this are similar to those of the semiconductor integrated circuit device in accordance with the first exemplary embodiment shown in FIG. 1, and thus a duplicated description will be omitted.

Figure 12:
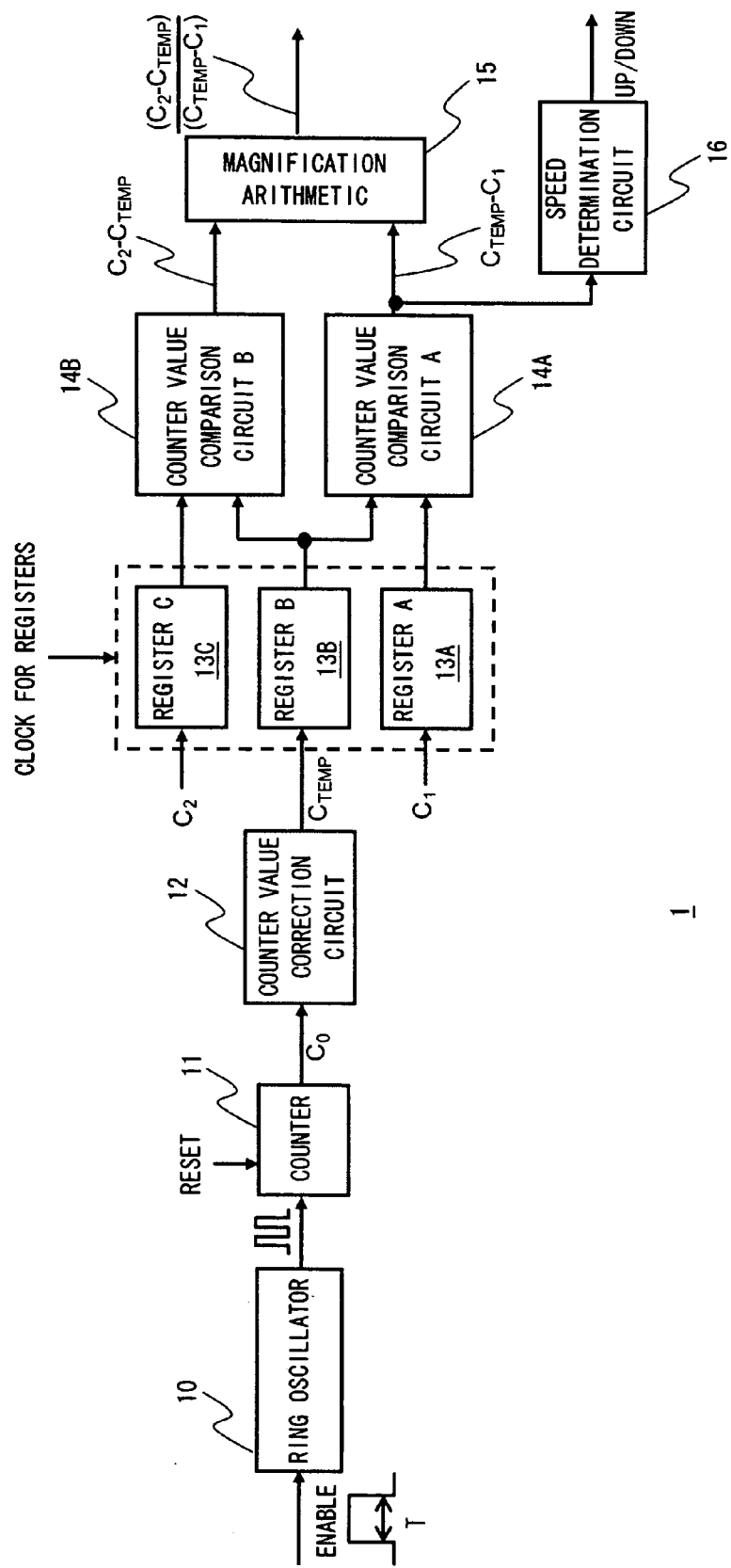
FIG. 12 is a block diagram showing a configuration of a target voltage prediction circuit in a semiconductor integrated circuit device according to a second exemplary embodiment.

A configuration example of a target voltage prediction circuit 1 will be shown in FIG. 12 with which the semiconductor integrated circuit device in accordance with the present exemplary embodiment is provided. The target voltage prediction circuit 1 shown in FIG. 12 has a ring oscillator 10, a counter 11, a counter value correction circuit 12, registers 13A, 13B, and 13C, counter value comparison circuits 14A and 14B, a magnification arithmetic circuit 15, and a speed determination circuit 16.

The same power supply voltage $V_{DD}$ as the target circuit 2 is supplied to the ring oscillator 10, and an oscillation cycle thereof is equal to a critical path delay of the target circuit 2. The ring oscillator 10 oscillates only during the period T when it holds that ENABLE=1. The counter 11 is reset once before it holds that ENABLE=1, counts an output pulse number $C_0$ of the ring oscillator during the period T when it holds that ENABLE=1, and the counted value is stored in the register 13B after it is corrected by the counter value correction circuit 12 so that it may hold that $C_{TEMP}=kC_0$. Here, it holds that $0<k\leq 1$. In addition, $C_{TEMP}$ is a value reflecting the operating frequency of the power supply voltage supplied to the target circuit 2.

In addition, required performance to the target circuit 2, i.e., counter values $C_1=T\times f_1$ and $C_2=T\times f_2$ corresponding to the required operating frequencies $f_1$ and $f_2$, are stored in the registers 13A and 13C, respectively. $C_{TEMP}-C_1$ and $C_2-C_{TEMP}$ are stored in the counter value comparison circuits 14A and 14B, respectively. In addition, the counter value comparison circuit 14A outputs $C_{TEMP}-C_1$ to the magnification arithmetic circuit 15, while the counter value comparison circuit 14B outputs $C_2-C_{TEMP}$ thereto. The magnification arithmetic circuit 15 is a circuit that calculates $(C_2-C_{TEMP})$ $(C_{TEMP}-C_1)$ and then outputs it, and it works as a step size prediction circuit. In addition, the speed determination circuit 16 outputs UP=0 and DOWN=1 if $C_{TEMP}-C_1$ is a positive, UP=1 and DOWN=0 if a negative, and UP=0 and DOWN=0 if equal to 0.

Figure 13:
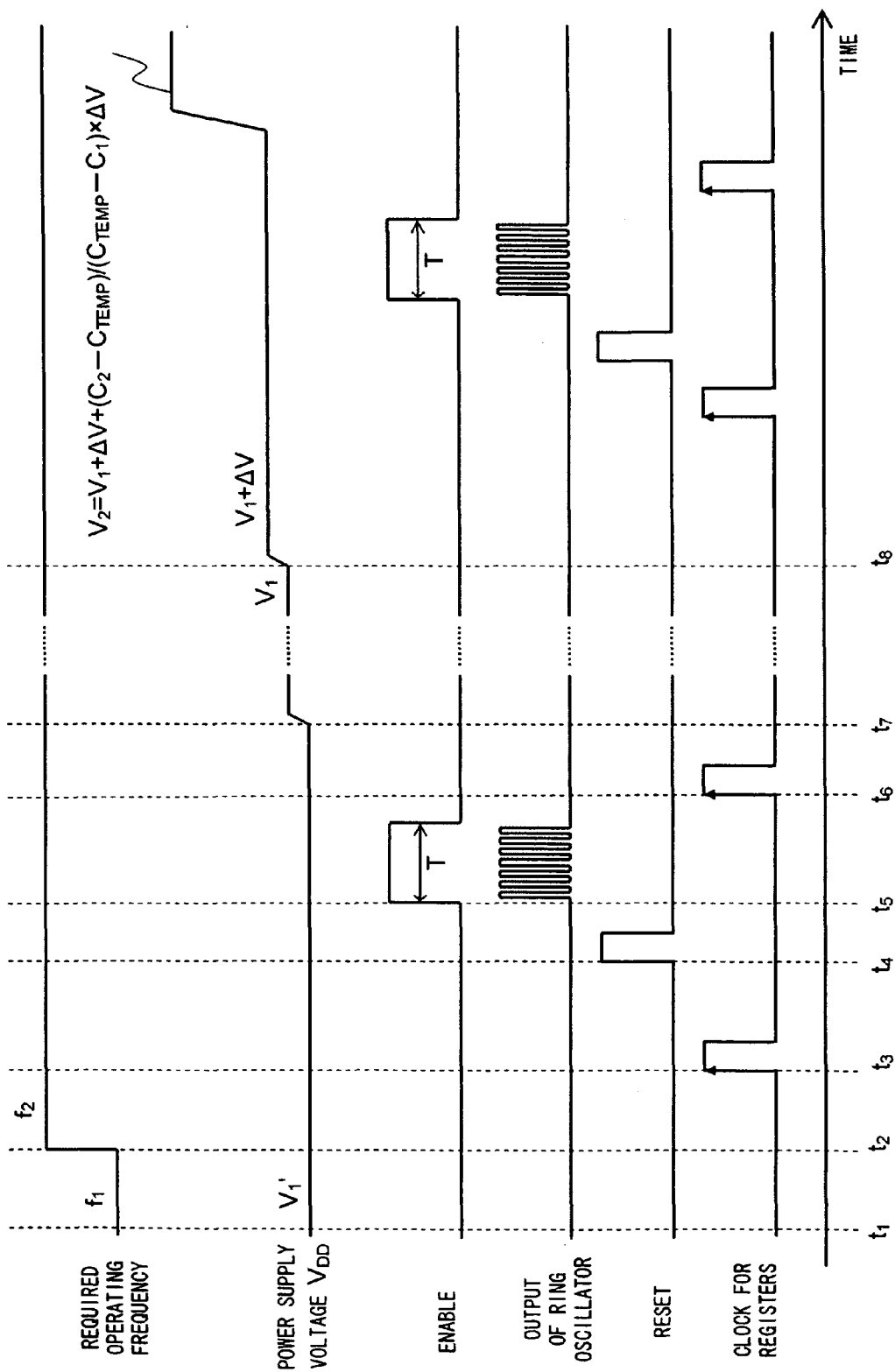
FIG. 13 is a timing chart showing an operation of the semiconductor integrated circuit device according to the second exemplary embodiment.

Next, operations of the semiconductor integrated circuit device will be described using a timing chart shown in FIG. 13 when a required operating frequency changes from $f_1$ to $f_2$. First, as an initial state, a power supply voltage of the target circuit 2 with respect to the required operating frequency $f_1$, i.e., the output $V_{DD}$ of the voltage supply circuit 4, is defined as $V_1'$ ($t_1$). When $f_1$ changes to $f_2$ with respect to this state ($t_2$), values of $C_1$ and $C_2$ are first stored in the registers 13A and 13C of the target voltage prediction circuit 1, respectively ($t_3$). Here, it holds that $C_1=T\times f_1$, and $C_2=T\times f_2$. Subsequently, after it holds that RESET=1 (high level) and the counter 11 is reset ($t_4$), ENABLE supplied to the ring oscillator 10 becomes 1 (high level) only during the period T ($t_5$), and a count value $C_{TEMP}$ based on the number of times of oscillation of the ring oscillator 10 during the period T is stored in the register 13B ($t_6$).

After the values are stored in the respective registers 13A, 13B, and 13C, $C_{TEMP}-C_1$ and $C_2-C_{TEMP}$ are stored in the counter value comparison circuits 14A and 14B, respectively. The counter value comparison circuit 14A then outputs the $C_{TEMP}-C_1$ to the magnification arithmetic circuit 15 and the speed determination circuit 16, while the counter value comparison circuit 14B outputs the $C_2-C_{TEMP}$ to the magnification arithmetic circuit 15. Here, the power supply voltage $V_{DD}$ is controlled so that if it holds that $C_{TEMP}-C_1>0$, the power supply voltage may be decreased, and so that if it holds that $C_{TEMP}-C_1<0$, the power supply voltage may be increased according to an output of the speed determination circuit 16 ($t_7$). Here, operations from $t_3$ to $t_6$ are repeated until it holds that $C_{TEMP}-C_1=0$. The power supply voltage $V_{DD}$ is defined as $V_1$ when it eventually holds that $C_{TEMP}-C_1=0$. After that, the control circuit 3 controls the output voltage of the voltage supply circuit 4 so that it may hold that $V_1+\Delta V$ ($t_8$). Subsequent operations are similar to those of the first exemplary embodiment.

Figure 14:
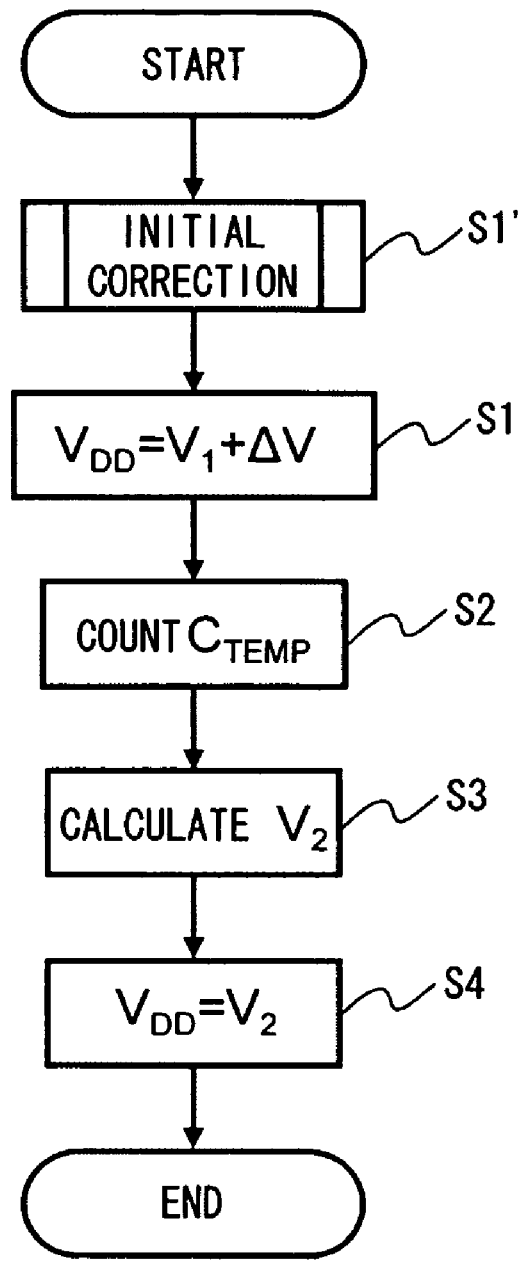
FIG. 14 is a flow chart showing the operation of the semiconductor integrated circuit device according to the second exemplary embodiment.

FIG. 14 is a flow chart showing operations of the semiconductor integrated circuit device in accordance with the present exemplary embodiment. In the present exemplary embodiment, the above-described initial correction process (Step S1') is added just before Step S1 of the flow chart showing the operations of the semiconductor integrated circuit device in accordance with the first exemplary embodiment (FIG. 8). In the initial correction process, operations from $t_4$ to $t_7$ shown in FIG. 13 are repeated. It is to be noted that the operations from Steps S1 to S4 of the flow chart shown in FIG. 14 is similar to those of the first exemplary embodiment, and thus a description thereof will be omitted.

Figure 15:
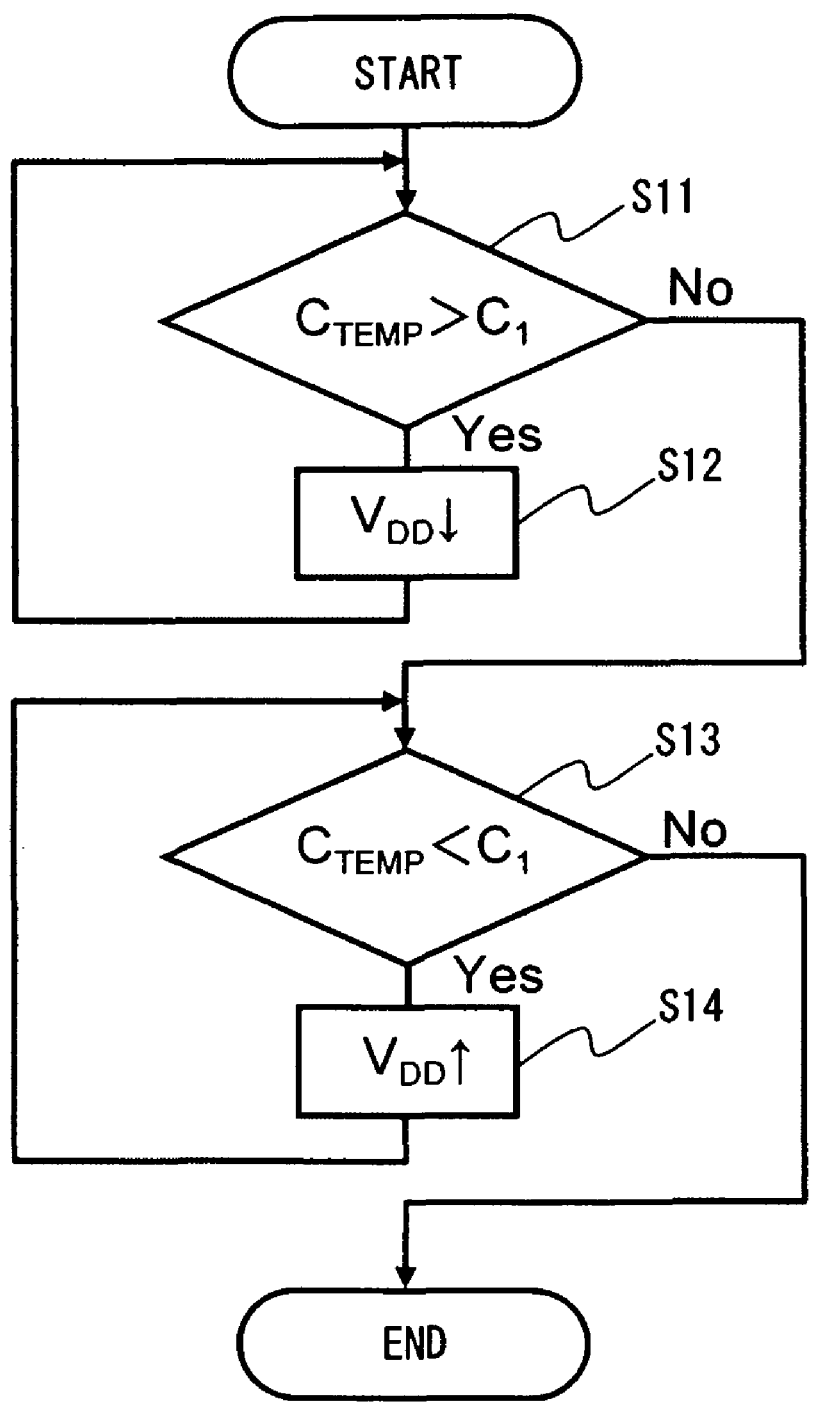
FIG. 15 is a flow chart showing voltage correction operations of the semiconductor integrated circuit device according to the second exemplary embodiment.

FIG. 15 is a flow chart showing voltage correction operations of the semiconductor integrated circuit device in accordance with the present exemplary embodiment. As shown in FIG. 15, first, it is determined whether condition $C_{TEMP}>C_1$ is satisfied or not (Step S11). If condition $C_{TEMP}>C_1$ is satisfied, the control circuit 3 controls the output of the voltage supply circuit 4 to decrease the power supply voltage $V_{DD}$ (Step S12). Meanwhile, if condition $C_{TEMP}>C_1$ is not satisfied, it is determined whether condition $C_{TEMP}<C_1$ is satisfied or not (Step S13). If condition $C_{TEMP}<C_1$ is satisfied, the control circuit 3 controls the output of the voltage supply circuit 4 to increase the power supply voltage $V_{DD}$ (Step S14). Meanwhile, if condition $C_{TEMP}<C_1$ is not satisfied, the voltage correction operations are terminated.

By using the semiconductor integrated circuit device in accordance with the present exemplary embodiment, even when the operating frequency of the target circuit 2 changes due to a factor, such as a temperature change, the power supply voltage value $V_1$ before controlled can be made to correspond with the minimum voltage value required to satisfy the required operating frequency thus enabling to enhance the accuracy of a final target voltage $V_2$.

It is to be noted that in the semiconductor integrated circuit device in accordance with the present exemplary embodiment, the speed determination circuit 16 outputs UP=0 and DOWN=1 if $C_{TEMP}-C_1$ is a positive, UP=1 and DOWN=0 if a negative, and UP=0 and DOWN=0 if equal to 0. However, if $|C_{TEMP}-C_1|$ is not more than a constant value, UP=0 and DOWN=0 may be output. By performing such control, a minimum unit of the control of the power supply voltage in the voltage supply circuit 4 can be increased, and thus the circuit can be made to operate even if it can not be controlled so that $C_{TEMP}-C_1$ may be equal to 0.

Third Exemplary Embodiment

Figure 16:
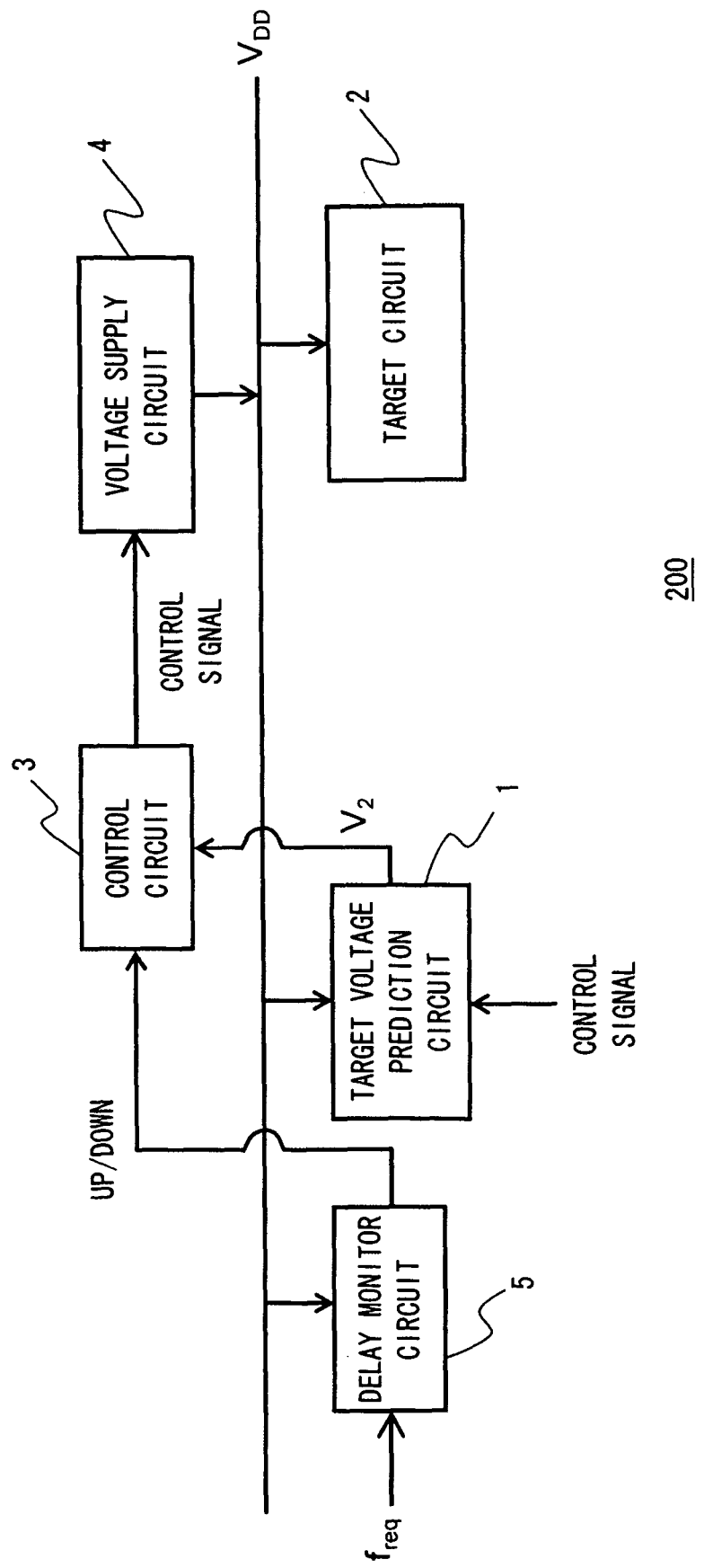
FIG. 16 is a block diagram showing a configuration of a semiconductor integrated circuit device according to a third exemplary embodiment.

Next, a third exemplary embodiment of the present invention will be described. FIG. 16 is a block diagram showing a configuration of a semiconductor integrated circuit device 200 in accordance with the present exemplary embodiment. As shown in FIG. 16, the semiconductor integrated circuit device 200 in accordance with the present exemplary embodiment is provided with a target circuit 2 whose power supply voltage $V_{DD}$ is variable, a voltage supply circuit 4 that supplies the power supply voltage $V_{DD}$ to the target circuit 2, a control circuit 3 that controls an output voltage of the voltage supply circuit 4, a target voltage prediction circuit 1 that predicts a voltage value of the power supply voltage $V_{DD}$ supplied to the target circuit 2, and a delay monitor circuit 5. In the present exemplary embodiment, the delay monitor circuit 5 is added to the semiconductor integrated circuit device in accordance with the first exemplary embodiment. It is to be noted that circuit configurations and operations other than the delay monitor circuit 5 are similar to those described in the first exemplary embodiment, and thus a duplicated description will be omitted.

Figure 17:
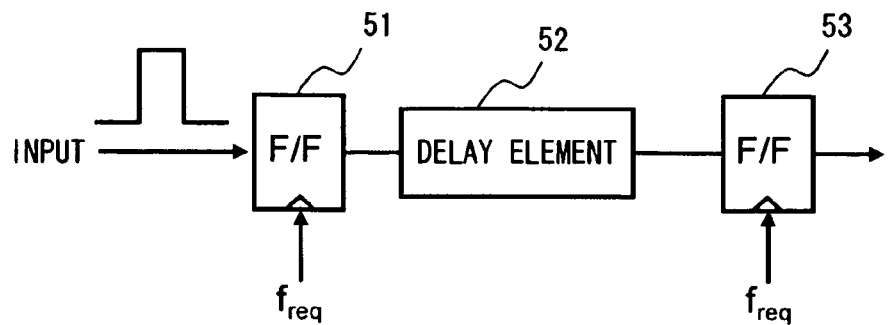
FIG. 17 is a diagram showing a configuration of a delay monitor circuit in the semiconductor integrated circuit device according to the third exemplary embodiment.

A configuration example of the delay monitor circuit 5 will be shown in FIG. 17. The delay monitor circuit 5 has a configuration in which flip-flops 51 and 53 are connected to the front and rear of the delay element 52. The delay element 52 has a delay time D equal to a critical path delay of the target circuit 2, and a power supply voltage equal to the one applied to the target circuit 2 is applied thereto. In addition, the flip-flops 51 and 53 are driven with a clock that has a frequency $f_{req}$ equal to the required operating frequency for the target circuit 2. Hence, in the delay monitor circuit 5, if it holds that $D<1/f_{req}$, a signal output from the flip-flop 51 with a certain clock is loaded into the flip-flop 53 with a next clock, while if it holds that $D>1/f_{req}$, it is not loaded.

Figure 18:
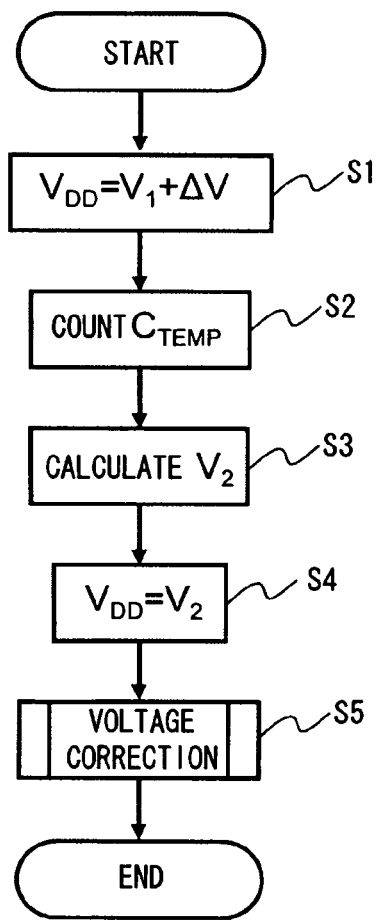
FIG. 18 is a flow chart showing an operation of the semiconductor integrated circuit device according to the third exemplary embodiment.

Next, operations of the semiconductor integrated circuit device will be described when the required operating frequency for the target circuit 2 changes from $f_1$ to $f_2$. FIG. 18 is a flow chart showing operations of the semiconductor integrated circuit device in accordance with the present exemplary embodiment. In the operations of the semiconductor integrated circuit device in accordance with the present exemplary embodiment, a voltage correction process (Step S5) is added compared with the operations in the first exemplary embodiment (refer to FIG. 8).

Operations, in which the output voltage $V_{DD}$ of the voltage supply circuit 4 is controlled from $V_1$ that is the minimum power supply voltage required to satisfy the required operating frequency $f_1$ to $V_2$ according to the control circuit 3 and the target voltage prediction circuit 1, are similar to those of the first exemplary embodiment (Steps S1 to S4). In the semiconductor integrated circuit device in accordance with the present exemplary embodiment, subsequently, a determination result (UP/DOWN) by the delay monitor circuit 5 is sent to the control circuit 3. The control circuit 3 then controls the output of the voltage supply circuit 4 to increase the power supply voltage $V_{DD}$ if it holds that UP=1, and to decrease the power supply voltage $V_{DD}$ if it holds that DOWN=1 based on an UP/DOWN signal (Step S5).

Figure 19:
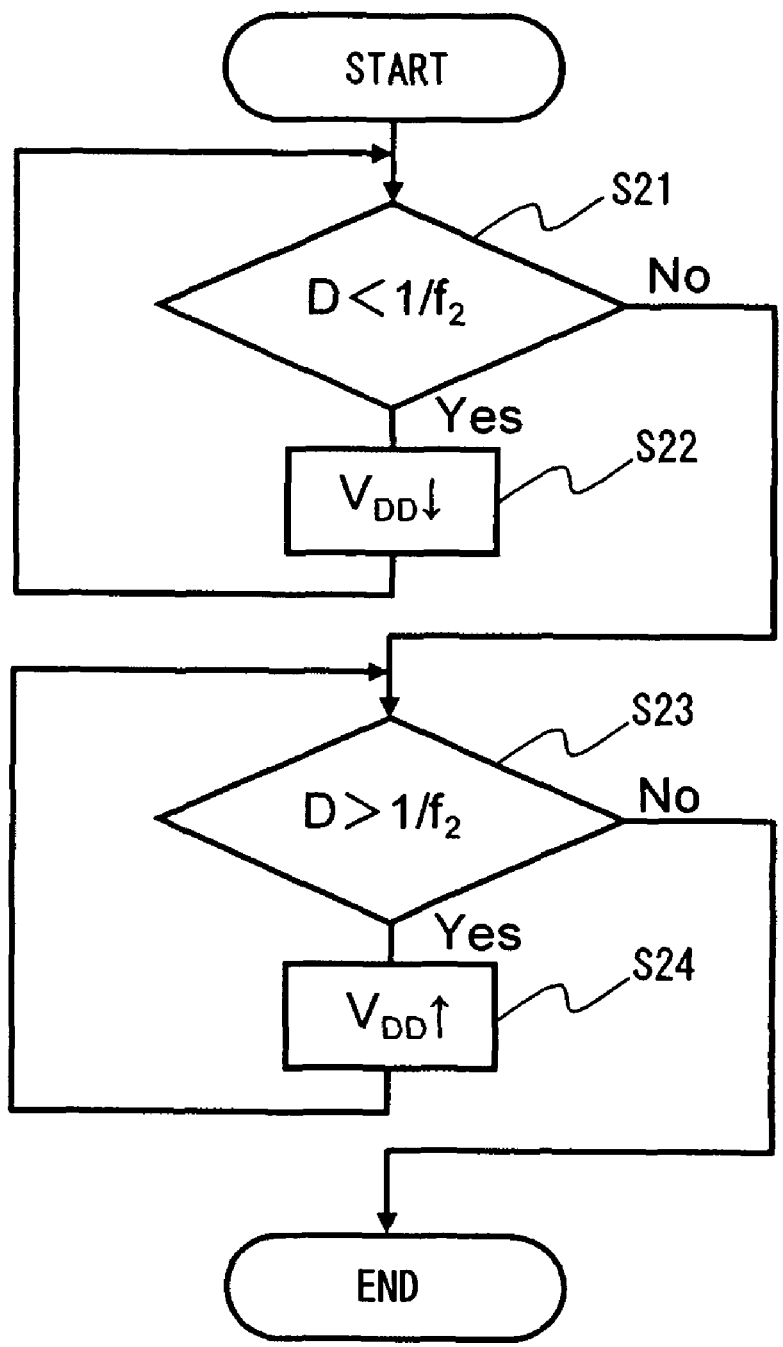
FIG. 19 is a flow chart showing voltage correction operations of the semiconductor integrated circuit device according to the third exemplary embodiment.

FIG. 19 is a flow chart showing voltage correction operations of the semiconductor integrated circuit device in accordance with the present exemplary embodiment. As shown in FIG. 19, first, it is determined whether condition $D<1/f_2$ is satisfied or not (Step S21). If condition $D<1/f_2$ is satisfied, the control circuit 3 controls the output of the voltage supply circuit 4 to decrease the power supply voltage $V_{DD}$ (Step S22). Meanwhile, if condition $D<1/f_2$ is not satisfied, it is determined whether condition $D>1/f_2$ is satisfied or not (Step S23). If condition $D>1/f_2$ is satisfied, the control circuit 3 controls the output of the voltage supply circuit 4 to increase the power supply voltage $V_{DD}$ (Step S24). Meanwhile, if condition $D<1/f_2$ is not satisfied, the voltage correction operations are terminated.

As described above, the delay monitor circuit 5 compares the operating frequency of the target circuit 2 with the required operating frequency $f_2$ after the power supply voltage of the target circuit 2 is controlled to be the target voltage value $V_2$ calculated by the target voltage prediction circuit 1. The control circuit 3 then controls the output of the voltage supply circuit 4 so that the operating frequency of the target circuit 2 and the required operating frequency $f_2$ may become substantially equal to each other.

By using the semiconductor integrated circuit device in accordance with the present exemplary embodiment, even when the power supply voltage $V_{DD}$ controlled according to the target voltage prediction circuit 1 deviates from a minimum power supply voltage $V_{min}$ required for the target circuit 2 satisfying the required operating frequency $f_2$, it becomes possible to converge the power supply voltage $V_{DD}$ to $V_{min}$. As a result, as well as being able to prevent an operable frequency of the target circuit 2 from becoming less than the required operating frequency, increase of power consumption caused by applying an excessive power supply voltage can also be prevented.

It is to be noted that in the semiconductor integrated circuit device in accordance with the present exemplary embodiment, although $(C_2-C_{TEMP})/(C_{TEMP}-C_1)$ is calculated and then output by the magnification arithmetic circuit 15, for example, a circuit that outputs a value of $2^{(a-b)}$ satisfying a following equation may be used.

$$(C_2-C_{TEMP}) > 2^a \geq (C_2-C_{TEMP})/2 \qquad \text{Equation 5}$$

$$(C_{TEMP}-C_1) > 2^b \geq (C_{TEMP}-C_1)/2 \qquad \text{Equation 6}$$

Figure 20:
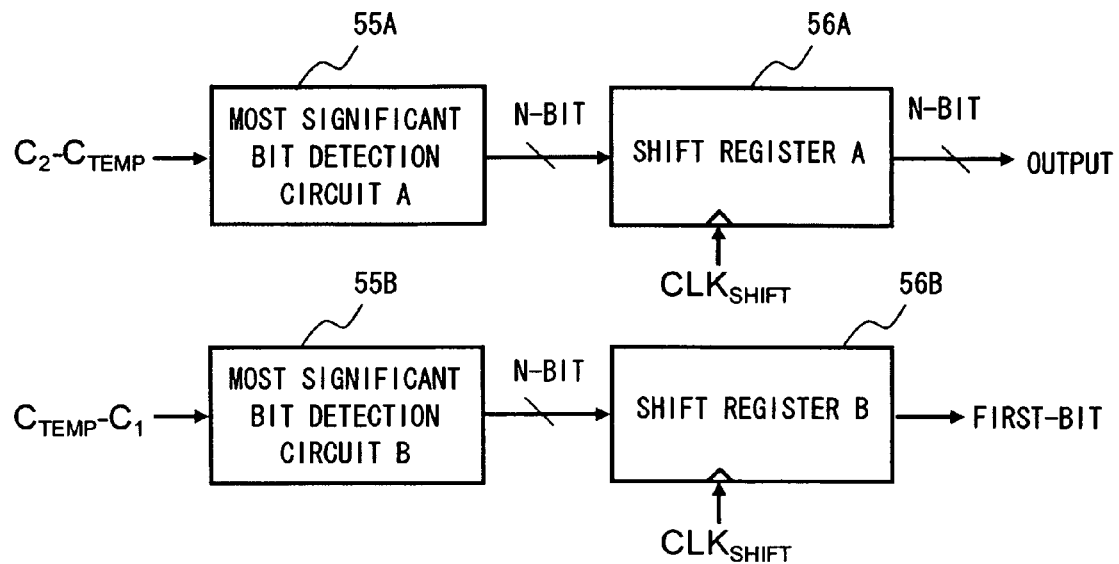
FIG. 20 is a diagram showing a configuration of a magnification arithmetic circuit in the semiconductor integrated circuit device according to the third exemplary embodiment.
Figure 21:
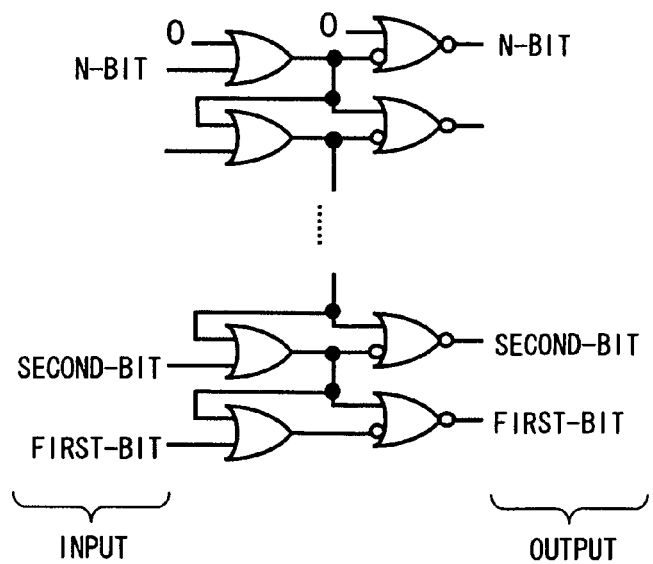
FIG. 21 is a diagram showing a configuration of a most significant bit detection circuit in the semiconductor integrated circuit device according to the third exemplary embodiment.
Figure 22:
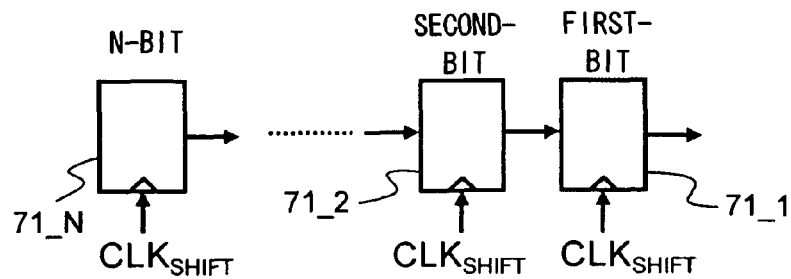
FIG. 22 is a diagram showing a configuration of a shift register in the semiconductor integrated circuit device according to the third exemplary embodiment.

A configuration example of the magnification arithmetic circuit 15 will be shown in FIG. 20 that outputs the value of $2^{(a-b)}$ satisfying Equation 5 and Equation 6. The magnification arithmetic circuit 15 shown in FIG. 20 has most significant bit detection circuits 55A and 55B, and shift registers 56A and 56B. Configuration examples of the most significant bit detection circuit and the shift register are shown in FIG. 21 and FIG. 22, respectively. As shown in FIG. 21, the most significant bit detection circuit 55 has a configuration in which a plurality of logic circuits are connected to each other. In addition, as shown in FIG. 22 the shift register 56 has a configuration in which a plurality of registers 71_1, 71_2, . . . , and 71_N are connected to each other.

By using the most significant bit detection circuit, all of "1" bits other than a most significant bit can be set to 0 with respect to an N-bit input numerical value. Hence, the most significant bit detection circuit 55A inputs $(C_2-C_{TEMP})$, and outputs $2^a$. In addition, the most significant bit detection circuit 55B inputs $(C_{TEMP}-C_1)$, and outputs $2^b$. $2^a$ and $2^b$ are supplied to the shift registers 56A and 56B, respectively.

Subsequently, data stored in the shift registers 56A and 56B is shifted to a lower bit in synchronization with a clock signal $CLK_{SHIFT}$. An output of the shift register 56A at a time of an output of the shift register 56B eventually being set to 1 becomes the value of $2^{(a-b)}$.

Calculation can be achieved in a simple circuit by using the above-described circuit, thus enabling to reduce a circuit area. It is to be noted that although up to 50% of error occurs in the accuracy of a target voltage, the number of times for controlling the power supply can be reduced to at least approximately not more than a half as compared with a conventional power supply control based on only a delay monitor circuit, thus enabling to reduce a time period for controlling the power supply voltage compared with the conventional technology.

Fourth Exemplary Embodiment

Figure 23:
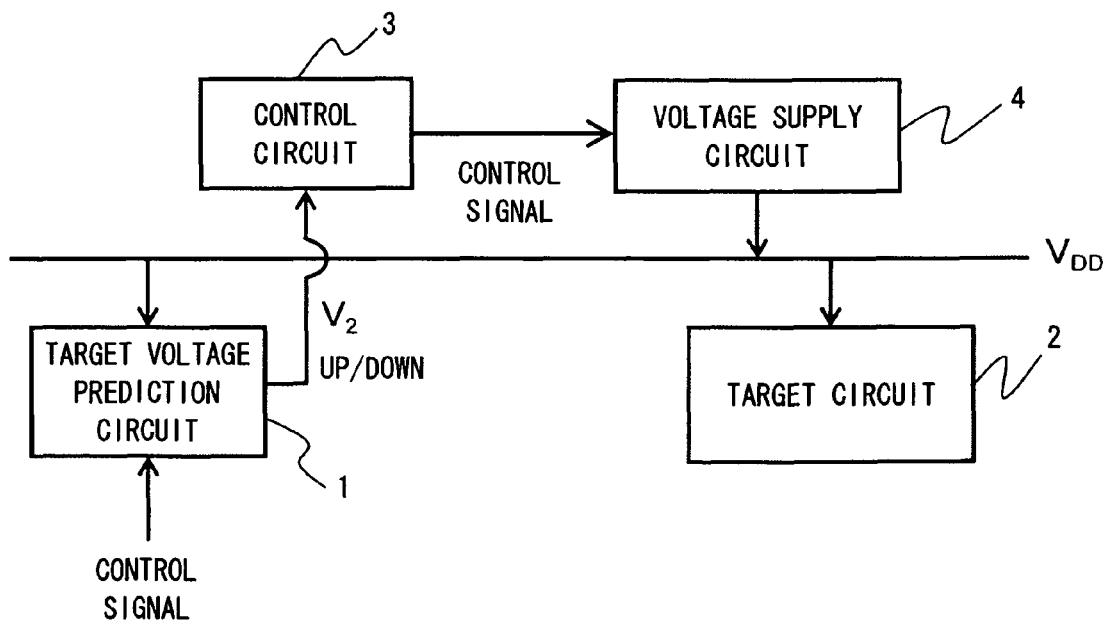
FIG. 23 is a block diagram showing a configuration of a semiconductor integrated circuit device according to a fourth exemplary embodiment.

Next, a fourth exemplary embodiment of the present invention will be described. FIG. 23 is a block diagram showing a configuration of a semiconductor integrated circuit device 300 in accordance with the present exemplary embodiment. As shown in FIG. 23, the semiconductor integrated circuit device 300 in accordance with the present exemplary embodiment is provided with a target circuit 2 whose power supply voltage $V_{DD}$ is variable, a voltage supply circuit 4 that supplies a power supply voltage $V_{DD}$ to the target circuit 2, a control circuit 3 that controls an output voltage of the voltage supply circuit 4, and a target voltage prediction circuit 1 that predicts a voltage value of the power supply voltage $V_{DD}$ supplied to the target circuit 2. It is to be noted that circuit configurations and operations other than the target voltage prediction circuit 1 are similar to those described in the first exemplary embodiment, and thus a duplicated description will be omitted.

Figure 24:
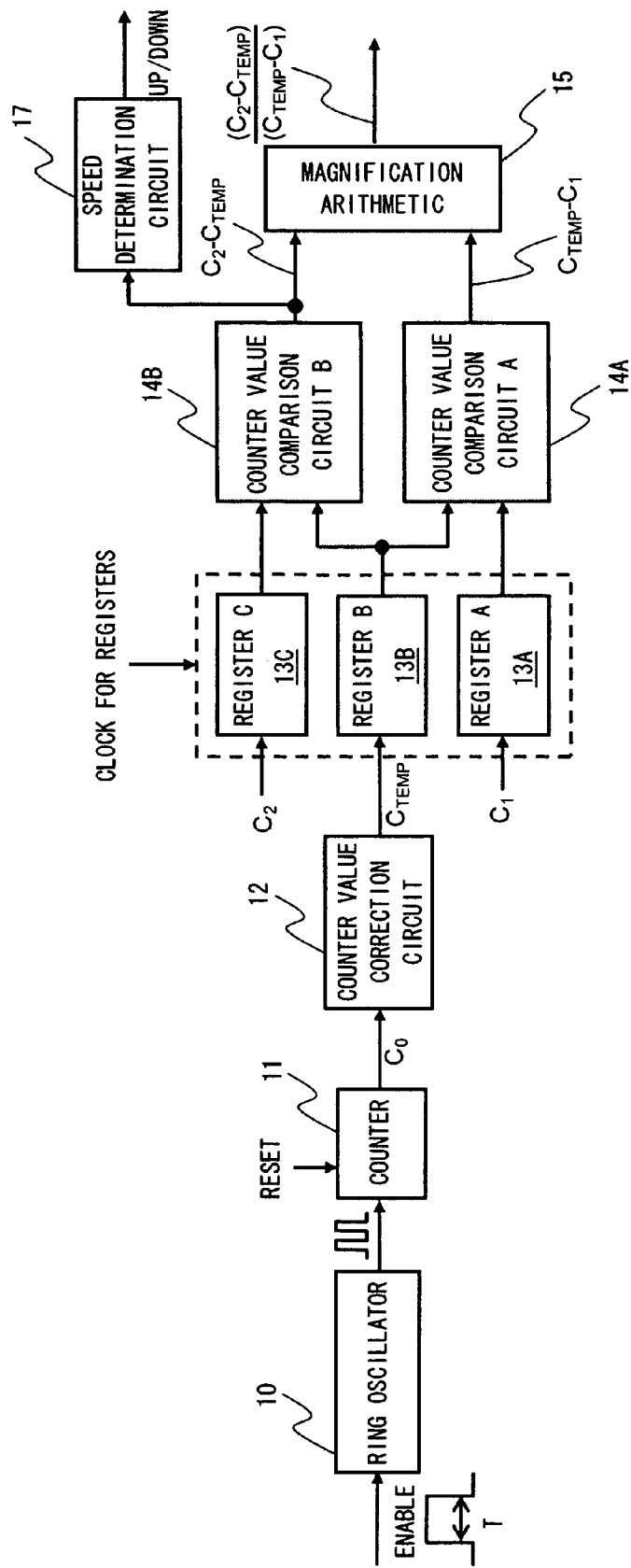
FIG. 24 is a block diagram showing a configuration of a target voltage prediction circuit in the semiconductor integrated circuit device according to the fourth exemplary embodiment.

A configuration example of the target voltage prediction circuit 1 will be shown in FIG. 24 with which the semiconductor integrated circuit device in accordance with the present exemplary embodiment is provided. The target voltage prediction circuit 1 shown in FIG. 24 has a ring oscillator 10, a counter 11, a counter value correction circuit 12, registers 13A, 13B, and 13C, counter value comparison circuits 14A and 14B, a magnification arithmetic circuit 15, and a speed determination circuit 17.

The same power supply voltage $V_{DD}$ as the target circuit 2 is supplied to the ring oscillator 10, and an oscillation cycle thereof is equal to a critical path delay of the target circuit 2. The ring oscillator 10 oscillates only during a period T when it holds that ENABLE=1. The counter 11 is reset once before it holds that ENABLE=1, counts an output pulse number $C_0$ of the ring oscillator during the period T when it holds that ENABLE=1, and the counted value is stored in the register 13B after it is corrected by the counter value correction circuit 12 so that it may hold that $C_{TEMP}=kC_0$. Here, it holds that $0<k\leq1$. In addition, $C_{TEMP}$ is a value reflecting the operating frequency of the power supply voltage supplied to the target circuit 2.

In addition, required performance to the target circuit 2, i.e., counter values $C_1=T\times f_1$ and $C_2=T\times f_2$ corresponding to the required operating frequencies $f_1$ and $f_2$, are stored in the registers 13A and 13C, respectively. $C_{TEMP}-C_1$ and $C_2-C_{TEMP}$ are stored in the counter value comparison circuits 14A and 14B, respectively. In addition, the counter value comparison circuit 14A outputs $C_{TEMP}-C_1$ to the magnification arithmetic circuit 15, while the counter value comparison circuit 14B outputs $C_2-C_{TEMP}$ thereto. The magnification arithmetic circuit 15 is a circuit that calculates $(C_2-C_{TEMP})(C_{TEMP}-C_1)$ and then outputs it, and it works as a step size prediction circuit. In addition, the speed determination circuit 17 outputs UP=1 and DOWN=0 if $C_2-C_{TEMP}$ is a positive, UP=0 and DOWN=1 if a negative, and UP=0 and DOWN=0 if equal to 0.

Figure 25:
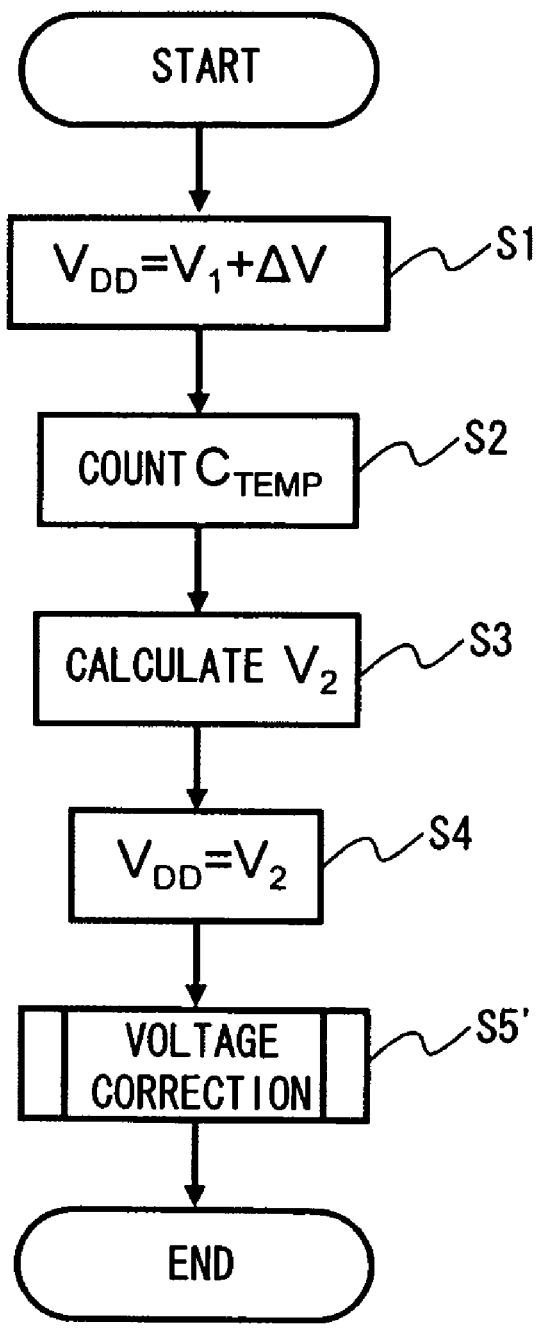
FIG. 25 is a flow chart showing an operation of the semiconductor integrated circuit device according to the fourth exemplary embodiment.

Next, operations of the semiconductor integrated circuit device will be described when the required operating frequency for the target circuit 2 changes from $f_1$ to $f_2$. FIG. 25 is a flow chart showing operations of the semiconductor integrated circuit device in accordance with the present exemplary embodiment. In the operations of the semiconductor integrated circuit device in accordance with the present exemplary embodiment, a voltage correction process (Step S5') is added compared with the operations in the first exemplary embodiment (refer to FIG. 8).

Operations, in which the output voltage $V_{DD}$ of the voltage supply circuit 4 is controlled from $V_1$ that is the minimum power supply voltage required to satisfy the required operating frequency $f_1$ to $V_2$ according to the control circuit 3 and the target voltage prediction circuit 1, are similar to those of the first exemplary embodiment (Steps S1 to S4). In the semiconductor integrated circuit device in accordance with the present exemplary embodiment, subsequently, the target voltage prediction circuit 1 repeats the operations in a period of $t_5$ to $t_8$ of the timing chart shown in FIG. 7, and transmits an UP/DOWN signal to the control circuit 3. The control circuit 3 then controls the output of the voltage supply circuit 4 to increase the power supply voltage $V_{DD}$ if it holds that UP=1, and to decrease it if DOWN=1 based on the UP/DOWN signal (Step S5').

Figure 26:
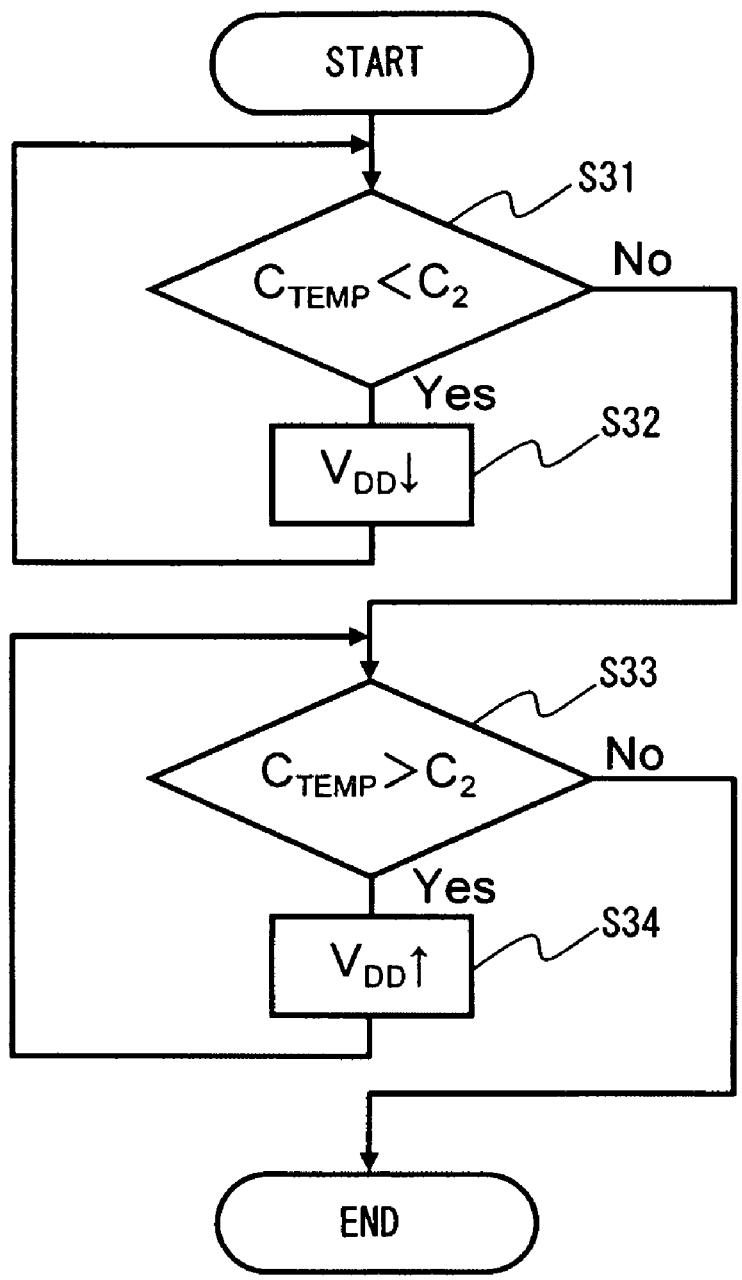
FIG. 26 is a flow chart showing voltage correction operations of the semiconductor integrated circuit device according to the fourth exemplary embodiment.

FIG. 26 is a flow chart showing voltage correction operations of the semiconductor integrated circuit device in accordance with the present exemplary embodiment. As shown in FIG. 26, first, it is determined whether condition $C_{TEMP}<C_2$ is satisfied or not (Step S31). If condition $C_{TEMP}<C_2$ is satisfied, the control circuit 3 controls the output of the voltage supply circuit 4 to decrease the power supply voltage $V_{DD}$ (Step S32). Meanwhile, if condition $C_{TEMP}<C_2$ is not satisfied, it is determined whether condition $C_{TEMP}>C_2$ is satisfied or not (Step S33). If condition $C_{TEMP}>C_2$ is satisfied, the control circuit 3 controls the output of the voltage supply circuit 4 to increase the power supply voltage. $V_{DD}$ (Step S34). Meanwhile, if condition $C_{TEMP}>C_2$ is not satisfied, the voltage correction operations are terminated.

As described above, by using the semiconductor integrated circuit device in accordance with the present exemplary embodiment, it becomes possible to converge the power supply voltage $V_{DD}$ to the minimum power supply voltage $V_{min}$ required for the target circuit 2 satisfying the required operating frequency $f_2$. As a result, as well as being able to prevent an operable frequency of the target circuit 2 from becoming less than the required operating frequency, increase of power consumption caused by applying an excessive power supply voltage can also be prevented. In addition, since a delay monitor circuit is not required, a circuit area can be suppressed to a small level.

It is to be noted that in the semiconductor integrated circuit device in accordance with the present exemplary embodiment, although the speed determination circuit 17 outputs UP=1 and DOWN=0 if $C_2-C_{TEMP}$ is a positive, UP=0 and DOWN=1 if a negative, and UP=0 and DOWN=0 if equal to 0, if $|C_2-C_{TEMP}|$ is not more than a constant value, UP=0 and DOWN=0 may be output. Performing such control enables excessive control of the power supply voltage to be suppressed, whereby as well as being able to suppress power consumption, stability of the power supply voltage can be improved.

Fifth Exemplary Embodiment

Next, a fifth exemplary embodiment of the present invention will be described. In the fifth exemplary embodiment, only the configuration of the target voltage prediction circuit 1 is different from that of the semiconductor integrated circuit device in accordance with the first exemplary embodiment of the present invention shown in FIG. 1. Configurations other than this are similar to those of the semiconductor integrated circuit device in accordance with the first exemplary embodiment shown in FIG. 1, and thus a duplicated description will be omitted.

Figure 27:
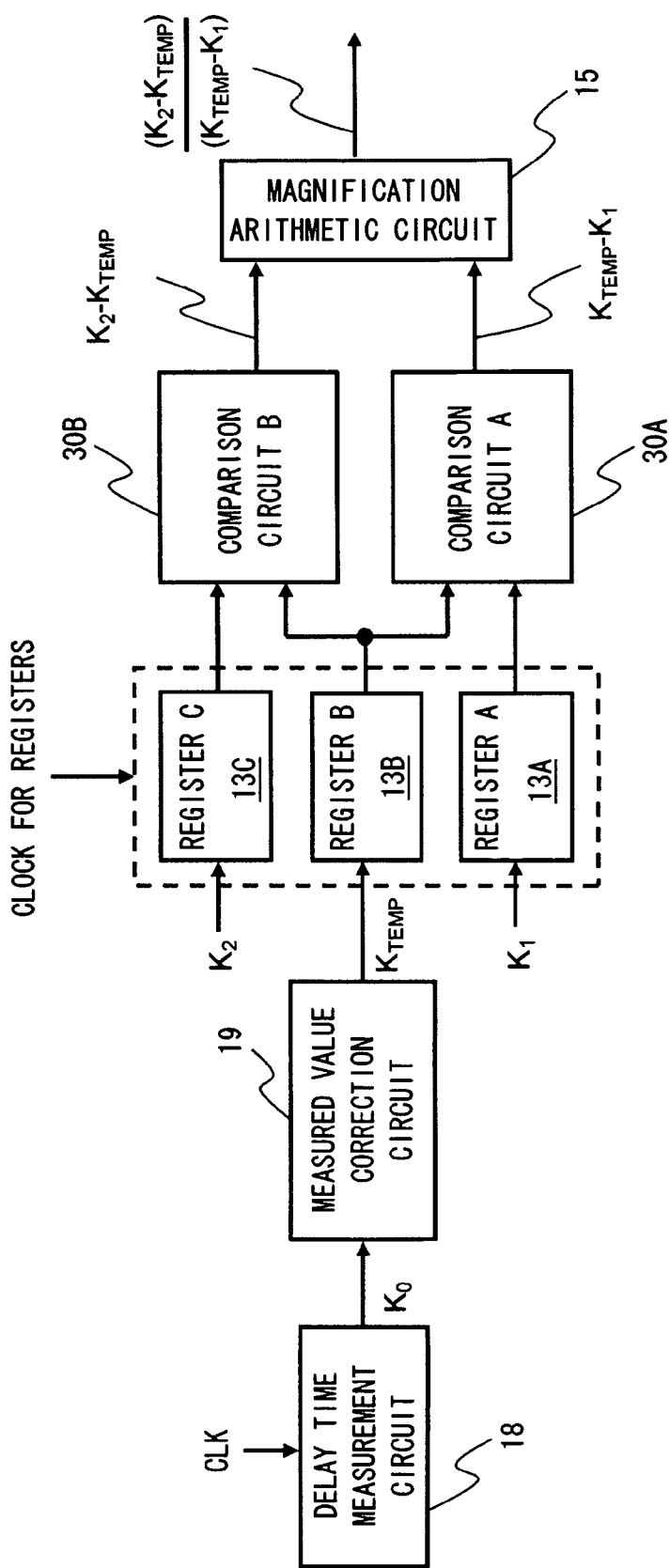
FIG. 27 is a block diagram showing a configuration of a target voltage prediction circuit in the semiconductor integrated circuit device according to a fifth exemplary embodiment.

A configuration example of a target voltage prediction circuit 1 will be shown in FIG. 27 with which the semiconductor integrated circuit device in accordance with the present exemplary embodiment is provided. The target voltage prediction circuit 1 shown in FIG. 27 has a delay time measurement circuit 18, a measured value correction circuit 19, registers 13A, 13B, and 13C, comparison circuits 30A and 30B, and a magnification arithmetic circuit 15.

Figure 28:
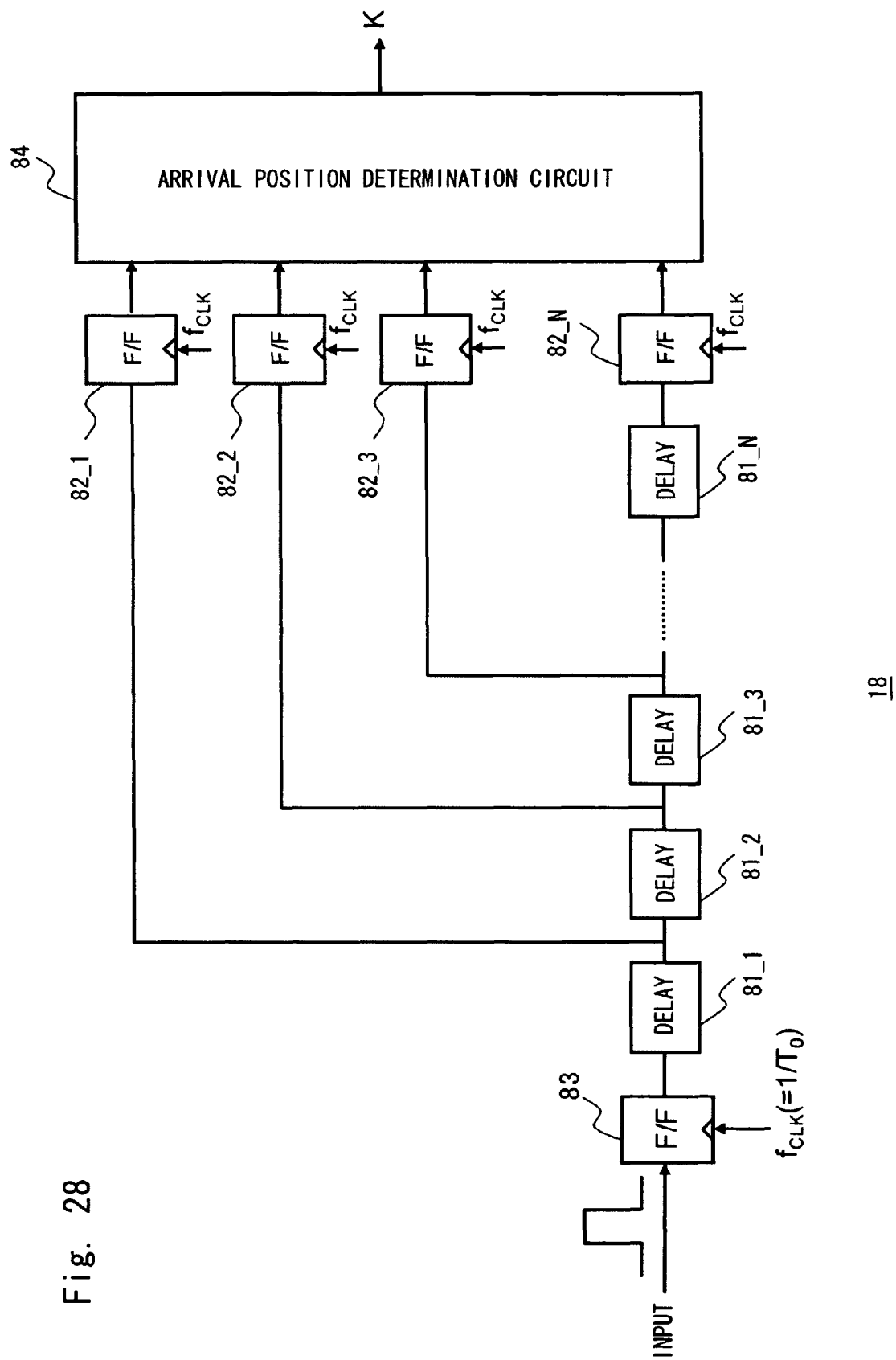
FIG. 28 is a diagram showing a configuration of a delay time measurement circuit in the semiconductor integrated circuit device according to the fifth exemplary embodiment.

A configuration example of the delay time measurement circuit 18 will be shown in FIG. 28. The delay time measurement circuit 18 has a configuration in which flip-flops 82_1, 82_2, . . . , and 82_N are respectively connected to each connection node of series-connected N delay elements 81_1, 81_2, . . . , and 81_N. A power supply voltage equal to the one applied to the target circuit 2 is applied to the each delay element. In addition, delay times caused by the respective delay elements are equal to each other, and it is a times as long as a critical path delay D of the target circuit 2.

Each flip-flop is synchronously driven with a clock signal CLK of a cycle $T_0$, a pulse signal is output from a flip-flop 83 with a certain clock, and data is loaded by the flip-flops 82_1, 82_2, . . . , and 82_N with a next clock. The loaded data is supplied to an arrival position determination circuit 84, and a value of K, which is the number of node at which the signal output from the flip-flop 83 eventually arrived in one clock cycle, is output from the arrival position determination circuit 84.

Figure 29:
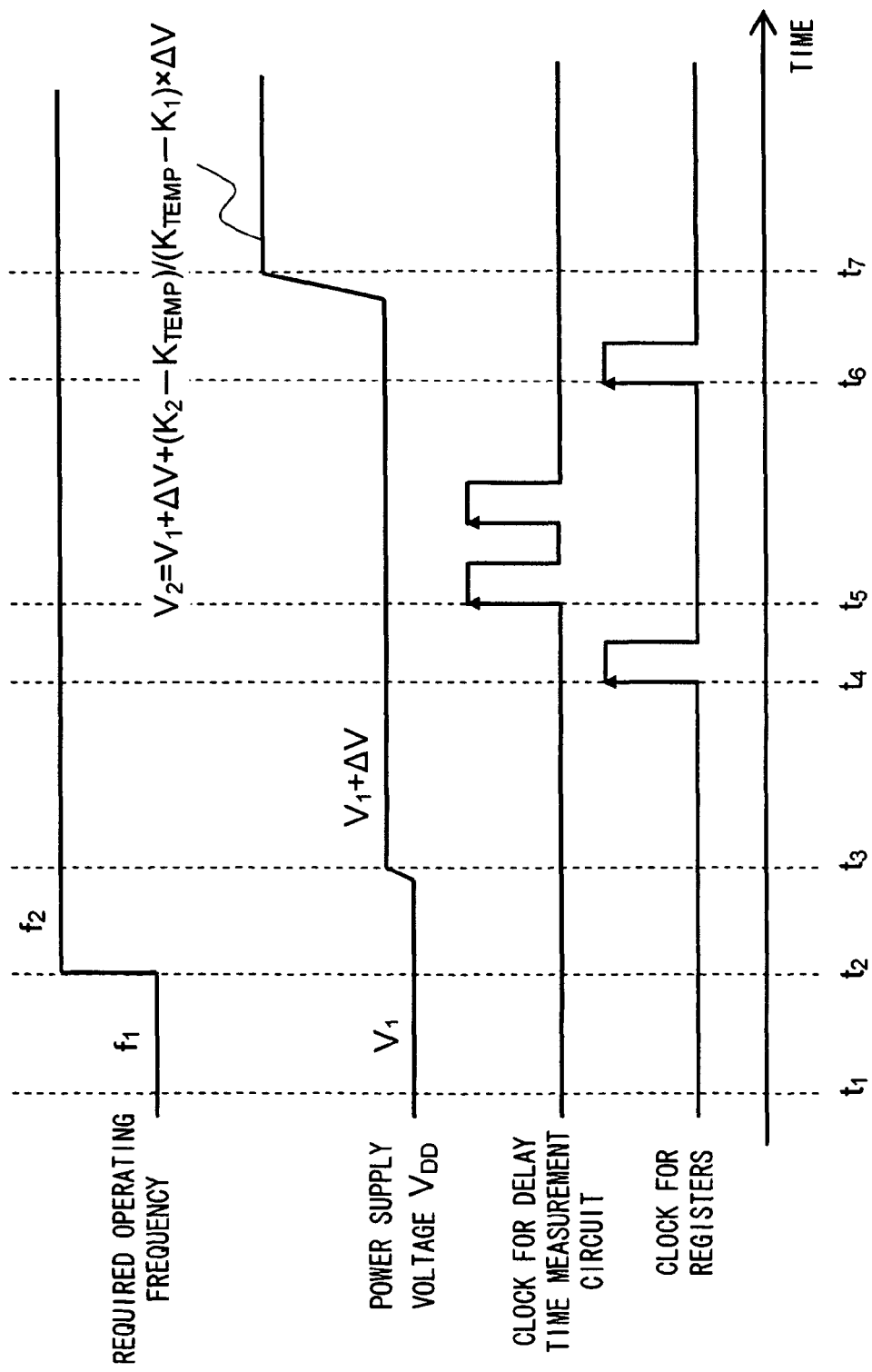
FIG. 29 is a timing chart showing an operation of the semiconductor integrated circuit device according to the fifth exemplary embodiment.

Next, operations of the semiconductor integrated circuit device will be described when a required operating frequency changes from $f_1$ to $f_2$ using a timing chart shown in FIG. 29.

First, as an initial state, a power supply voltage of the target circuit 2 with respect to a required operating frequency $f_1$, i.e., an output of the voltage supply circuit 4, is defined as $V_1$ ($t_1$). Here, the power supply voltage $V_1$ is a minimum power supply voltage required for the target circuit 2 operating at the required operating frequency $f_1$. When $f_1$ changes to $f_2$ with respect to this state ($t_2$), the control circuit 3 first controls the output voltage of the voltage supply circuit 4 to be $V_1+\Delta V$ ($t_3$). Subsequently, values of $K_1=T_0 \times f_1/\alpha$ and $K_2=T_0 \times f_2/\alpha$ are stored in the registers 13A and 13C of the target voltage prediction circuit 1, respectively ($t_4$). Here, $K_1$ and $K_2$ are known values required to satisfy the required operating frequencies $f_1$ and $f_2$, respectively. Moreover, when a clock is supplied twice to the delay time measurement circuit 18 ($t_5$), the measured value correction circuit 19 generates a value of $K_{TEMP}=mK_0$ based on an output value $K_0$ from the delay time measurement circuit 18, and stores $K_{TEMP}$ in the register 13B ($t_6$). Here, it holds that $0 < m \leq 1$.

After the values are stored in the respective registers 13A, 13B, and 13C, $K_{TEMP}-K_1$ and $K_2-K_{TEMP}$ are stored in the comparison circuits 30A and 30B, respectively. The comparison circuit 30A then outputs the $K_{TEMP}-K_1$ to the magnification arithmetic circuit 15, while the comparison circuit 30B outputs the $K_2-K_{TEMP}$ thereto. The magnification arithmetic circuit 15 calculates a value of $(K_2-K_{TEMP})$ $(K_{TEMP}-K_1)$ based on values of $K_{TEMP}-K_1$ and $K_2-K_{TEMP}$, and outputs the calculated value to the control circuit 3. The control circuit 3 controls the output voltage $V_{DD}$ of the voltage supply circuit 4 so that it may hold that $V_2=V_1+\Delta V+(K_2-K_{TEMP})$ $(K_{TEMP}-K_1) \times \Delta V$ ($t_7$).

As described above, by using the semiconductor integrated circuit device in accordance with the present exemplary embodiment, when the required operating frequency of the target circuit 2 changes, the number of times for controlling the power supply voltage to converge it to the required minimum power supply voltage can be suppressed to twice, thus enabling to reduce a time period for controlling the power supply voltage. Moreover, in the semiconductor integrated circuit device in accordance with the present exemplary embodiment, circuits can be designed without a temporal restriction caused by operation performance of the counter since a counting operation becomes unnecessary. In addition, since the operating frequency of the target circuit has (1−m) times as much margin as the required performance, even when the operating frequency of the target circuit 2 is decreased due to a temperature change etc., the target circuit 2 can be made to operate while the required operating frequency is always satisfied.

The first to fifth exemplary embodiments can be combined as desirable by one of ordinary skill in the art.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A semiconductor integrated circuit device comprising:
   a target circuit, a power supply voltage of the target circuit being variable;
   a voltage supply circuit that supplies the power supply voltage to the target circuit;
   a control circuit that controls an output voltage of the voltage supply circuit; and
   a target voltage prediction circuit that predicts a voltage value of the power supply voltage supplied to the target circuit, wherein
   when a required operating frequency of the target circuit changes from a first operating frequency to a second operating frequency, the control circuit changes the output voltage of the voltage supply circuit by a predetermined voltage value,
   the target voltage prediction circuit detects a change amount of the operating frequency of the target circuit along with the change of the predetermined voltage value, and calculates a target voltage value based on a relation between the change amount of the operating frequency and the predetermined voltage value,
   the voltage supply circuit supplies a power supply voltage corresponding to the target voltage value to the target circuit,
   the target voltage prediction circuit comprises a ring oscillator and a counter,
   an oscillation cycle of the ring oscillator changes depending on the power supply voltage of the target circuit,
   the counter measures an output pulse number of the ring oscillator within a predetermined period, and
   the target voltage prediction circuit detects the change amount of the operating frequency by using a change of the output pulse number.

2. The semiconductor integrated circuit device according to claim 1, wherein the target voltage prediction circuit calculates the target voltage value so that a ratio of a difference between the second operating frequency and the first operating frequency to a difference between the target voltage value and the power supply voltage value before being changed becomes equal to a ratio of the change amount of the operating frequency to the predetermined voltage value.

3. The semiconductor integrated circuit device according to claim 1, wherein the predetermined voltage value changed by the control circuit comprises a minimum unit of voltage value with which the control circuit controls the voltage supply circuit.

4. The semiconductor integrated circuit device according to claim 1, wherein the target voltage prediction circuit calculates the target voltage value so that the target voltage value corresponds with a minimum power supply voltage required for the operating frequency of the target circuit satisfying the second operating frequency.

5. The semiconductor integrated circuit device according to claim 1 wherein when the required operating frequency of the target circuit changes from the first operating frequency to the second operating frequency, the control circuit controls the output of the voltage supply circuit to comprise a power supply voltage with which the operating frequency of the target circuit satisfies the first operating frequency before the control circuit changes the output voltage of the voltage supply circuit by the predetermined voltage value.

6. The semiconductor integrated circuit device according to claim 5, wherein the power supply voltage that satisfies the first operating frequency comprises a minimum voltage required to satisfy the first operating frequency.

7. The semiconductor integrated circuit device according to claim 1, wherein
the target voltage prediction circuit further comprises a plurality of delay elements connected in series,
delay times of the delay elements change depending on the power supply voltage of the target circuit, and
the target voltage prediction circuit detects the change amount of the operating frequency by using a change amount of a number of delay elements in which a signal propagates within a predetermined period.

8. The semiconductor integrated circuit device according to claim 1, further comprising a delay monitor circuit that compares the operating frequency of the target circuit and the required operating frequency,
wherein the output of the voltage supply circuit is further controlled based on an output value from the delay monitor circuit after being controlled to be the target voltage value calculated by the target voltage prediction circuit.

9. The semiconductor integrated circuit device according to claim 8, wherein the output of the voltage supply circuit is controlled so that the operating frequency of the target circuit and the required operating frequency are substantially equal to each other.

10. The semiconductor integrated circuit device according to claim 8, wherein a speed determination circuit is provided at a part of the target voltage prediction circuit, the speed determination circuit compares a value corresponding to the operating frequency of the target circuit with a value corresponding to the second operating frequency, and is used as the delay monitor circuit.

11. The semiconductor integrated circuit device according to claim 9, wherein a speed determination circuit is provided at a part of the target voltage prediction circuit, the speed determination circuit compares a value corresponding to the operating frequency of the target circuit with a value corresponding to the second operating frequency, and is used as the delay monitor circuit.

12. A method for controlling a power supply voltage, the power supply voltage being supplied to a target circuit, the method comprising:
changing an output voltage of a voltage supply circuit by a predetermined voltage value, when a required operating frequency of the target circuit changes from a first operating frequency to a second operating frequency;
detecting, with a target voltage prediction circuit, a change amount of an operating frequency of the target circuit along with a change of the predetermined voltage value; and
calculating, with said target voltage prediction circuit, the power supply voltage supplied to the target circuit based on a relation between the change amount of the operating frequency and the predetermined voltage value,
the target voltage prediction circuit comprises a oscillator and a counter,
an oscillation cycle of the ring oscillator changes depending on the power supply voltage of the target circuit,
the counter measures an output pulse number of the ring oscillator within a predetermined period, and
the target voltage prediction circuit detects the change amount of the operating frequency by using a change of the output pulse number.

13. The method for controlling the power supply voltage according to claim 12, wherein a target voltage value is calculated so that a ratio of a difference between the second operating frequency and the first operating frequency to a difference between the target voltage value and the power supply voltage value before being changed becomes equal to a ratio of the change amount of the operating frequency to the predetermined voltage value.

14. The method for controlling the power supply voltage according to claim 12, wherein the power supply voltage of the target circuit is controlled so as to correspond with a minimum power supply voltage required for the operating frequency of the target circuit satisfying the second operating frequency.

15. The method for controlling the power supply voltage according to claim 12, wherein when the required operating frequency of the target circuit changes from the first operating frequency to the second operating frequency, the power supply voltage of the target circuit is controlled so that the operating frequency of the target circuit satisfies the first operating frequency before changing the output voltage of the voltage supply circuit by the predetermined voltage value.

16. The method for controlling the power supply voltage according to claim 15, wherein the power supply voltage that satisfies the first operating frequency comprises a minimum voltage required to satisfy the first operating frequency.

17. The method for controlling the power supply voltage according to claim 12, wherein the power supply voltage is supplied to the target circuit so that the operating frequency of the target circuit and the required operating frequency are substantially equal to each other.

* * * * *